United States Patent
Manolakos et al.

(10) Patent No.: US 12,216,221 B2
(45) Date of Patent: *Feb. 4, 2025

(54) LOW-LAYER (DCI OR MAC CE) DL PUNCTURING INDICATOR FOR POSITIONING REFERENCE SIGNALS (PRS)

(71) Applicant: QUALCOMM Incorporated, San Diego, CA (US)

(72) Inventors: Alexandros Manolakos, Escondido, CA (US); Weimin Duan, San Diego, CA (US); Gokul Sridharan, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/688,732

(22) Filed: Mar. 7, 2022

(65) Prior Publication Data

US 2022/0187411 A1 Jun. 16, 2022

Related U.S. Application Data

(63) Continuation-in-part of application No. 17/640,651, filed as application No. PCT/US2020/058957 on Nov. 4, 2020.

(30) Foreign Application Priority Data

Nov. 7, 2019 (GR) .............................. 20190100499

(51) Int. Cl.
*G01S 5/00* (2006.01)
*H04L 5/00* (2006.01)
(Continued)

(52) U.S. Cl.
CPC .......... *G01S 5/0063* (2013.01); *H04L 5/0051* (2013.01); *H04W 72/0453* (2013.01); *H04W 72/23* (2023.01); *H04W 72/51* (2023.01)

(58) Field of Classification Search
CPC .... G01S 5/0063; G01S 5/0244; G01S 5/0236; H04L 5/0051; H04L 5/0035;
(Continued)

(56) References Cited

U.S. PATENT DOCUMENTS 10,547,421 B2  1/2020  Palanivelu et al.
2012/0093101 A1  4/2012  Dai et al.
(Continued)

FOREIGN PATENT DOCUMENTS

WO  WO-2012111937 A2  8/2012
WO  2018064537 A1  4/2018
(Continued)

OTHER PUBLICATIONS

Intel Corporation: "Design Aspects for NR DL Positioning", 3GPP Draft, 3GPP TSG RAN WG1 Meeting #96, R1-1902511 Intel-NR_DL_POS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 16, 2019 (Feb. 16, 2019), XP051600207, 23 Pages, Retrieved from the Internet: URL:http://www.3gpp.org/ftp/tsg%5Fran/WG1%5FRL1/TSGR1%5F96/Docs/R1%2D1902511%2Ezip [retrieved on Feb. 16, 2019], paragraph [02. 5] paragraph [0005].

(Continued)

*Primary Examiner* — Kabir A Timory
(74) *Attorney, Agent, or Firm* — Procopio, Cory, Hargreaves & Savitch LLP/Qualcomm

(57) ABSTRACT

During positioning of a user equipment (UE), (DL) positioning reference signals (PRS) transmitted by one or more
(Continued)

transmission reception point (TRP) in a wireless communication system may be preempted or punctured by higher priority transmissions, such as ultra-reliable low-latency traffic (URLLC). A PRS preemption indication (PI) may be provided to a UE identifying one or more TRPs affected by preemption. The PRS PI may further identify the time domain and frequency domain of the preempted DL PRS transmissions. The PRS PI may identify the time domain, e.g., based on a number of PRS symbols between two monitoring occasions, wherein only PRS symbols that contain positioning reference signals associated with the group of TRPs are counted. The PRS PI may identify the frequency domain by identifying at least one of four or more frequency sub-bands of the preempted DL PRS transmissions.

32 Claims, 16 Drawing Sheets

(51) Int. Cl.
　　*H04W 72/0453*　　(2023.01)
　　*H04W 72/23*　　(2023.01)
　　*H04W 72/51*　　(2023.01)
(58) Field of Classification Search
　　CPC ............ H04L 5/0094; H04W 72/0453; H04W 72/23; H04W 72/51; H04W 76/36; H04W 64/00
　　See application file for complete search history.

(56) References Cited

U.S. PATENT DOCUMENTS

| | | | |
|---|---|---|---|
| 2019/0230618 A1* | 7/2019 | Saur | ................... H04W 56/001 |
| 2019/0372617 A1 | 12/2019 | Chen et al. | |
| 2020/0014487 A1 | 1/2020 | Akkarakaran et al. | |
| 2020/0204317 A1 | 6/2020 | Kim et al. | |
| 2020/0367278 A1 | 11/2020 | Hosseini et al. | |

FOREIGN PATENT DOCUMENTS

| | | |
|---|---|---|
| WO | 2019032844 A1 | 2/2019 |
| WO | 2021092072 A1 | 5/2021 |

OTHER PUBLICATIONS

International Search Report and Written Opinion—PCT/US2020/058957—ISA/EPO—Feb. 19, 2021.
International Search Report and Written Opinion—PCT/US2023/013060—ISA/EPO—Jun. 5, 2023.
CATT: "DL Reference Signals for NR Positioning", 3GPP Draft, 3GPP TSG RAN WG1 Meeting #98bis, R1-1910318, POS DL Reference Signals, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808500, 18 Pages, the whole document.

* cited by examiner

LOW-LAYER (DCI OR MAC CE) DL PUNCTURING INDICATOR FOR POSITIONING REFERENCE SIGNALS (PRS)

CROSS-REFERENCE TO RELATED APPLICATIONS

This application is a Continuation in-part of U.S. application Ser. No. 17/640,651, entitled "LOW-LAYER (DCI OR MAC CE) DL PUNCTURING INDICATOR FOR POSITIONING REFERENCE SIGNALS (PRS)," filed Mar. 4, 2022, which claims priority to International Application No. PCT/US2020/058957, entitled "LOW-LAYER (DCI OR MAC CE) DL PUNCTURING INDICATOR FOR POSITIONING REFERENCE SIGNALS (PRS)," filed Nov. 4, 2020, which claims priority to Greek Patent Application No. 20190100499, entitled "LOW-LAYER (DCI OR MAC CE) DL PUNCTURING INDICATOR FOR POSITIONING REFERENCE SIGNALS (PRS)," filed Nov. 7, 2019, all of which are assigned to the assignee hereof and which are expressly incorporated herein by reference in their entireties.

BACKGROUND

Field

The subject matter disclosed herein relates to wireless communications systems, and more particularly to systems, methods, and devices that support positioning reference signaling preemption.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

During positioning of a user equipment (UE), positioning reference signals (PRS) transmitted by one or more transmission reception point (TRP) in a wireless communication system may be preempted or punctured by higher priority transmissions, such as ultra-reliable low-latency traffic (URLLC). A PRS preemption indication (PI) may be provided to a UE identifying one or more TRPs affected by preemption. The PRS may be downlink (DL) PRS and the PRS PI may be received from a serving TRP or the PRS may be sidelink (SL) PRS. The PRS PI may further identify the time domain and frequency domain of the preempted DL PRS transmissions. The PRS PI may identify the time domain, e.g., based on a number of PRS symbols between two monitoring occasions, wherein only PRS symbols that contain positioning reference signals associated with the group of TRPs are counted. The PRS PI may identify the frequency domain by identifying at least one of four or more frequency sub-bands of the preempted DL PRS transmissions. The UE may perform positioning measurements using received DL PRS transmissions while excluding the preempted DL PRS transmissions from the positioning measurements.

In one implementation, a method for supporting positioning of a user equipment (UE) performed by the UE includes receiving assistance data for positioning reference signals from a plurality of transmission reception points (TRPs); receiving a plurality of positioning reference signals from the plurality of TRPs; receiving a positioning reference signal preemption indication (PRS PI) indicating that one or more positioning reference signals associated with one or more TRPs have been preempted; and performing positioning measurements using received positioning reference signals from the plurality of TRPs base at least on the PRS PI indication.

In one implementation, a user equipment (UE) capable of supporting positioning for the UE, the UE includes at least one wireless transceiver configured to wirelessly communicate with a plurality of transmission reception points (TRPs); at least one memory; and at least one processor coupled to the at least one wireless transceiver and the at least one memory and configured to: receive assistance data for positioning reference signals from a plurality of transmission reception points (TRPs); receive a plurality of positioning reference signals from the plurality of TRPs; receive a positioning reference signal preemption indication (PRS PI) indicating that one or more positioning reference signals associated with one or more TRPs have been preempted; and perform positioning measurements using received positioning reference signals from the plurality of TRPs based at least on the PRS PI indication.

In one implementation, a user equipment (UE) capable of supporting positioning for the UE, includes means for receiving assistance data for positioning reference signals from a plurality of transmission reception points (TRPs); means for receiving a plurality of positioning reference signals from the plurality of TRPs; means for receiving a positioning reference signal preemption indication (PRS PI) indicating that one or more positioning reference signals associated with one or more TRPs have been preempted; and means for performing positioning measurements using received positioning reference signals from the plurality of TRPs based at least on the PRS PI indication.

In one implementation, a non-transitory storage medium including program code stored thereon, the program code is operable to configure at least one processor in a user equipment (UE) to support positioning for the UE, the non-transitory storage medium includes program code to receive assistance data for positioning reference signals from a plurality of transmission reception points (TRPs); program code to receive a plurality of positioning reference signals from the plurality of TRPs; program code to receive a positioning reference signal preemption indication (PRS PI) indicating that one or more positioning reference signals associated with one or more TRPs have been preempted; and program code to perform positioning measurements using received positioning reference signals from the plurality of TRPs based at least on the PRS PI indication.

In one implementation, a method for supporting positioning of a user equipment (UE) performed by a serving transmission reception point (TRP), includes receiving an indication from one or more TRPs that positioning reference signals transmitted by the one or more TRPs have been preempted by another transmission; and transmitting a positioning reference signal preemption indication (PRS PI) to the UE indicating that the positioning reference signals received by the UE and associated with a group of TRPs comprising the one or more TRPs have been preempted.

In one implementation, a serving transmission reception point (TRP) configured to support positioning of a user equipment (UE), the serving TRP comprising: at least one external interface configured to communicate with the UE and a wireless network; at least one memory; and at least one processor coupled to the external interface and the at least one memory and configured to: receive an indication from one or more TRPs in the wireless network that positioning reference signals transmitted by the one or more TRPs have been preempted by another transmission; and transmitting a positioning reference signal preemption indication (PRS PI) to the UE indicating that the positioning reference signals received by the UE and associated with a group of TRPs comprising the one or more TRPs have been preempted.

In one implementation, a serving transmission reception point (TRP) configured to support positioning of a user equipment (UE), includes means for receiving an indication from one or more TRPs that one or more positioning reference signals transmitted by the one or more TRPs have been preempted by another transmission; and means for transmitting a positioning reference signal preemption indication (PRS PI) to the UE indicating that the one or more positioning reference signals received by the UE and associated with one or more TRPs comprising the one or more TRPs have been preempted.

In one implementation, a non-transitory storage medium including program code stored thereon, the program code is operable to configure at least one processor in a serving transmission reception point (TRP) to support positioning of a user equipment (UE), includes program code to receive an indication from one or more TRPs that one or more positioning reference signals transmitted by the one or more TRPs have been preempted by another transmission; and program code to transmit a positioning reference signal preemption indication (PRS PI) to the UE indicating that the one or more positioning reference signals received by the UE and associated with one or more TRPs comprising the one or more TRPs have been preempted.

Figure 1:
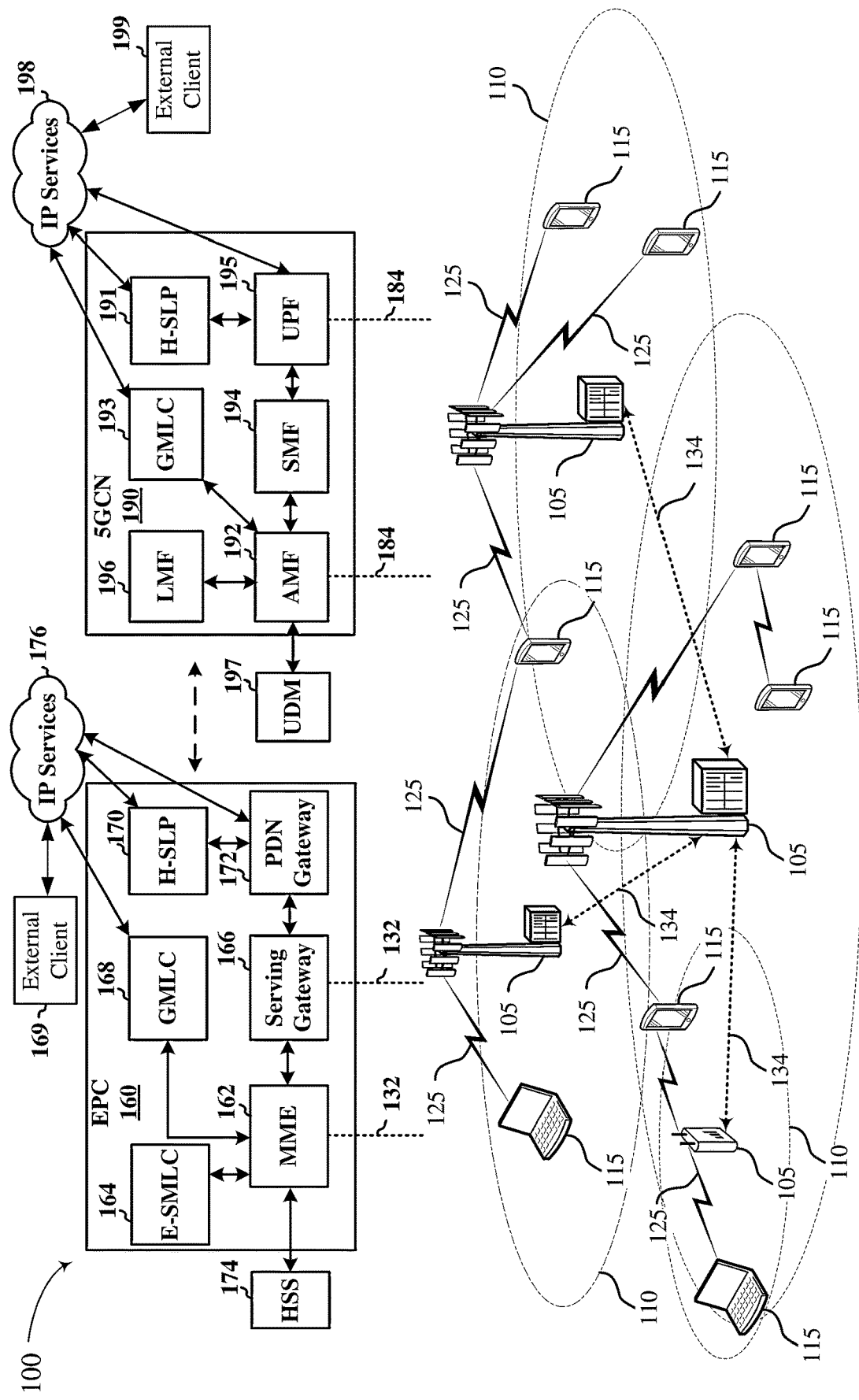
FIG. 1 shows an architecture of an exemplary system capable of supporting preemption information for downlink (DL) Positioning Reference Signal (PRS) transmissions in accordance with aspects of the present disclosure.

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as Long Term Evolution (LTE), code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

The terms "mobile device", "mobile stations" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile device" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile device."

As described herein, ultra-reliable low-latency traffic (URLLC) may be multiplexed with downlink (DL) positioning reference signals (PRS) transmitted by a serving or neighboring transmission reception point (TRP) in a wireless communication system. In some cases, the URLLC traffic may preempt or puncture resources occupied by, for example, DL PRS signals, which are used for positioning of a UE. This preemption may take the form of puncturing one or more symbols or bandwidth parts of the PRS with the URLLC data.

Since the puncturing of DL PRS transmissions with URLLC communications is not part of the positioning procedures, positioning errors will result if the UE attempts to process it. Accordingly, some devices (e.g., a serving base station or TRP) may send preemption information indicating that certain resources in the DL PRS transmitted by the serving TRP or neighboring TRP is preempted by URLLC data. The preemption information, for example, may be provided in Downlink Control Information (DCI) based or media access control (MAC) control element (CE) based indication. A UE may receive the preemption information indicating that URLLC data may puncture or preempt one or more DL PRS resources. The present disclosure provides techniques for signaling preemption information for DL PRS resources and responses thereto.

FIG. 1 illustrates an example of a wireless communications system 100 that supports preemption information for DL PRS transmissions in accordance with aspects of the present disclosure. The wireless communications system 100 includes base stations 105, UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A base station 105 as described herein may include or may be referred to by those skilled in the art as a base transceiver station, a radio base station, an access point, a radio transceiver, a NodeB, an eNodeB (eNB), a next-generation NodeB or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNB s, relay base stations, and the like.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 115. Examples of UEs 115 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 115 may be referred to as IoT devices (such as a parking meter, gas pump, toaster, vehicles, heart monitor, etc.). Some of the UEs 115 may be referred to as Industrial Internet of Things (IIoT) devices, such as sensors, instruments, and other devices networked together, in an industrial application. The UE 115 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink (UL) transmissions from a UE 115 to a base station 105, or downlink (DL) transmissions from a base station 105 to a UE 115, or sidelink (SL) transmissions from one UE 115 to another UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a base station 105 may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a machine type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or to enable automated behavior by machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the EPC 160 and/or 5GC 190 and with one another. At least some of the base stations 105 (e.g., which may be an example of an evolved NodeB (eNB), a next generation NodeB (gNB), or an access node controller (ANC)) may interface with their respective core networks through backhaul links (e.g., via an Si or other interface). For example, eNB base stations 105 may interface with EPC 160 via backhaul links 132, while gNB base stations 105 may interface with 5GC 190 via backhaul links 184. Base stations 105 may communicate with one another over backhaul links 134 (e.g., via an X2 or other interface), which may be wired or wireless communication links, either directly (e.g., directly between base stations 105) or indirectly (e.g., via core network or intermediate base stations). The backhaul links 134 may be wired or may be wireless, as illustrated by backhaul link 134 to movable base station 105'.

The core networks 160/190 may provide user authentication, access authorization, tracking, Internet Protocol (IP) connectivity, and other access, routing, or mobility functions.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be regarded as supporting different spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core networks 160/190 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols and, in some instances, a symbol of a mini-slot or the mini-slot itself may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations 105 or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs 115 that can support simultaneous communications via carriers associated with more than one different bandwidth.

As described herein, wireless communications system 100 may support NR and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105 or as part of a mobility or beam management procedure for directional transmission associated with the enhanced channel resources.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems and emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a location server 164/196, e.g., LMF in a NR network, or E-SMLC 164 in LTE (sometimes referred to as location server 164/196), may be used to provide positioning assistance, such as PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. The location server 164/196 is illustrated in FIG. 1 as being located in the core networks 160/190, but may be external to the core networks 160/190, e.g., in an NG-RAN.

A position estimation of the UE 115 may be determined using reference signals, such as PRS signals, from one or more base stations 105. Positioning methods, such as Observed Time Difference of Arrival (OTDOA), DL Time Difference of Arrival (DL-TDOA), DL Angle of Departure (DL AoD), Enhanced Cell ID (ECID) are position methods that may be used to estimate the position of the UE 115 using reference signals from base stations. OTDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g. as defined in 3GPP TS 36.211.

Other positioning methods may use reference signals transmitted by or received by base stations. While the present disclosure may be detailed with reference to a single positioning method for brevity, it should be understood that present disclosure is applicable to multiple positioning methods, including downlink-based positioning methods, uplink based positioning methods and downlink and uplink based positioning methods. For example, other positioning methods include, e.g., downlink based positioning methods such as DL Time Difference of Arrival (DL-TDOA), DL Angle of Departure (DL AoD), Enhanced Cell ID (ECID); uplink based positioning methods, e.g., UL Time Difference of Arrival (UL-TDOA), UL Angle of Arrival (UL AoA), UL Relative Time of Arrival (UL-RTOA); and downlink and uplink based positioning methods, e.g., Round-trip time (RTT) with one or more neighboring base stations.

Figure 2:
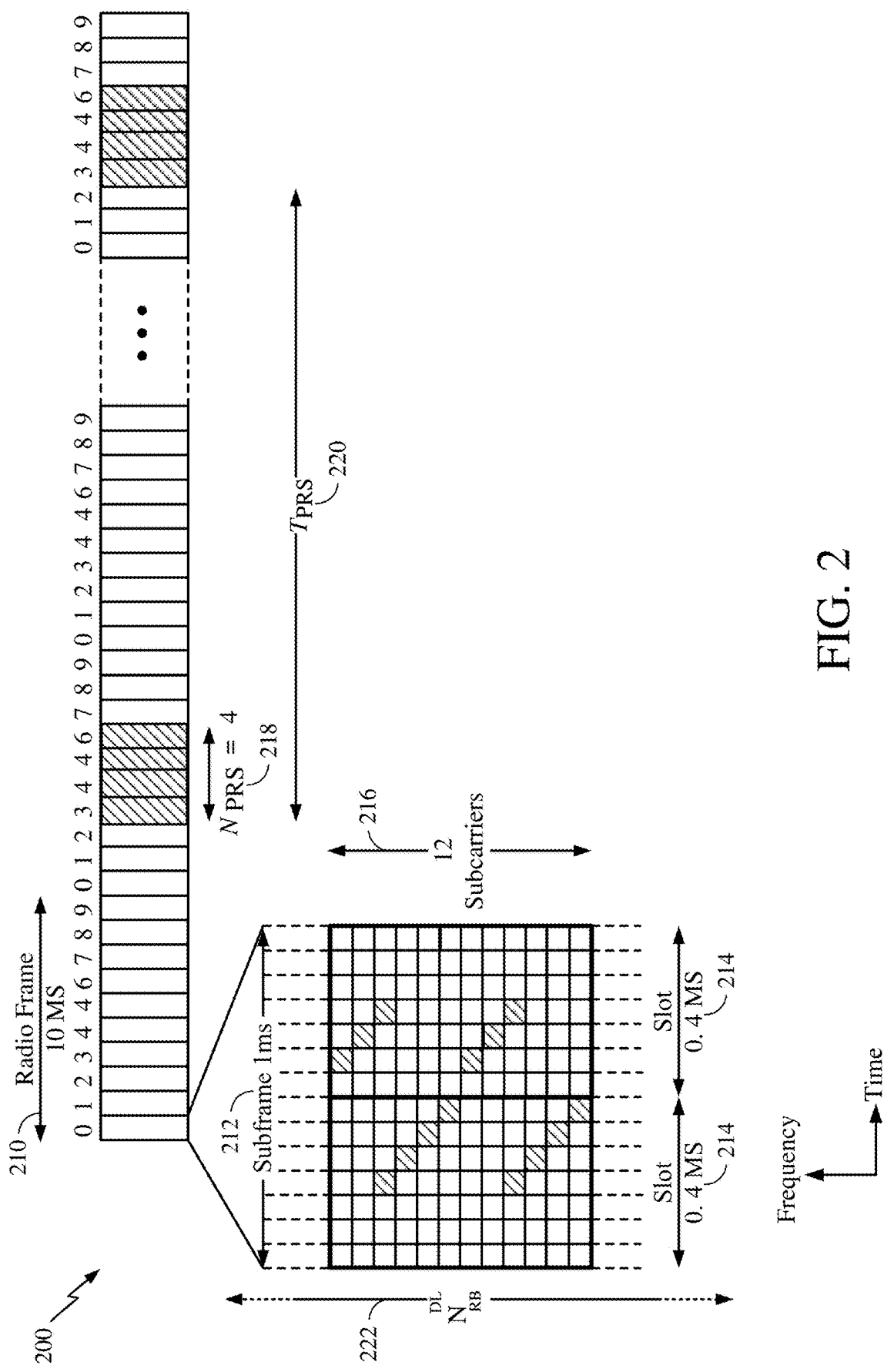
FIG. 2 shows the structure of an exemplary subframe with PRS.

FIG. 2 shows a structure of an exemplary conventional subframe sequence 200 with PRS positioning occasions. Subframe sequence 200 may be applicable to the broadcast of PRS signals from a base station (e.g., any of the base stations described herein) or other network node. The subframe sequence 200 may be used in LTE systems, and the same or similar subframe sequence may be used in other communication technologies/protocols, such as 5G and NR. In FIG. 2, time is represented horizontally (e.g., on the X axis) with time increasing from left to right, while frequency is represented vertically (e.g., on the Y axis) with frequency increasing (or decreasing) from bottom to top. As shown in FIG. 2, downlink and uplink radio frames 210 may be of 10 millisecond (ms) duration each. For downlink frequency division duplex (FDD) mode, radio frames 210 are organized, in the illustrated example, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216 (also referred to as "tones" or "bins"). For example, for a normal length cyclic prefix (CP) using, for example, 15 kHz spacing, subcarriers 216 may be grouped into a group of twelve (12) subcarriers. A resource of one OFDM symbol length in the time domain and one subcarrier in the frequency domain (represented as a block of subframe 212) is referred to as a resource element (RE). Each grouping of the 12 subcarriers 216 and the 14 OFDM symbols is termed a resource block (RB) and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

Note that the frequency component of a resource block (e.g., the 12 subcarriers) is referred to as a physical resource block (PRB).

A base station may transmit radio frames (e.g., radio frames 210), or other physical layer signaling sequences, supporting PRS signals (i.e. a downlink (DL) PRS) according to frame configurations either similar to, or the same as that, shown in FIG. 2, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 2.

A collection of resource elements that are used for transmission of PRS signals is referred to as a "PRS resource." The collection of resource elements can span multiple PRBs in the frequency domain and N (e.g., 1 or more) consecutive symbol(s) within a slot 214 in the time domain. For example, the cross-hatched resource elements in the slots 214 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number TRPs of milliseconds or subframes. As an example, FIG. 2 illustrates a periodicity of positioning occasions where $N_{PRS}$ equals 4 218 and TRPS is greater than or equal to 20 220. In some aspects, TRPs may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity (TRPS). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to PRS discussed above, UL PRS transmitted by UEs, sometimes referred to as sounding reference signals (SRS) in NR are UE-specifically configured reference signals used for the purposes of the sounding the uplink radio channel. Like for channel state information reference signals (CSI-RS), such sounding provides various levels of knowledge of the radio channel characteristics. For example, the SRS can be used at the gNB simply to obtain signal strength measurements, e.g., for the purposes of UL beam management. In another example, SRS can be used at the gNB to obtain detailed amplitude and phase estimates as a function of frequency, time, and space. In NR, channel sounding with SRS supports a more diverse set of use cases compared to LTE. For example, SRS supports downlink CSI acquisition for reciprocity-based gNB transmit beamforming (downlink MIMO), uplink CSI acquisition for link adaptation and codebook/non-codebook based precoding for uplink MIMO, and uplink beam management.

The time/frequency mapping of an SRS resource may be defined by the following characteristics. Time duration NsymbSRS is the time duration of an SRS resource, which can be 1, 2, or 4 consecutive OFDM symbols within a slot, in contrast to LTE which allows only a single OFDM symbol per slot. Starting symbol location l0 is the starting symbol of an SRS resource, which can be located anywhere within the last 6 OFDM symbols of a slot provided the resource does not cross the end-of-slot boundary. Repetition factor R is for an SRS resource configured with frequency hopping, repetition allows the same set of subcarriers to be sounded in R consecutive OFDM symbols before the next hop occurs. The allowed values of R are 1,2,4 where R≤NsymbSRS. Transmission comb spacing $K_{TC}$ and comb offset kTC define a frequency domain comb structure occupied by resource elements (REs) of an SRS resource, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , KTC-1 REs. Thus, for comb spacing KTC=2, there are 2 different combs available for multiplexing if needed, and for comb spacing KTC=4, there are 4 different available combs. For the case of periodic and semi-persistent SRS, a periodicity is semi-statically configured such that the resource is transmitted once every N slots where the allowed configurable values are N ∈ {1,2,4,5,8,10,16,20,32,40,64, 80,160,320,640,1280,2560}. In addition, an offset O is configured where O ∈ {0,1, . . . , N−1} measured in number of slots. The reference point for the slot offset is with respect to the first slot (slot 0) of radio frame 0. . . . The bandwidth (BW) configuration of an SRS resource is controlled by the RRC parameters; C_"SRS", n_"shift", B_"SRS", b_"hop", and n_"RRC". Together these parameters define which portion of a bandwidth part (BWP) is sounded by an SRS resource. The parameter C_"SRS" ∈{0,1, . . . , 63} selects a bandwidth configuration for the SRS resource corresponding to a particular row of a length-64 Table. For positioning, the number of consecutive OFDM symbols in an SRS resource is configurable with one of the values in the set {1, 2, 4, 8, 12}. For positioning, starting positions in the time domain for the SRS resource can be anywhere in the slot, i.e. an offset $l_{offset}$ range of { 0,1, . . . , 13}. For positioning, with regard to UL Beam management/alignment towards serving and neighboring cells, UE transmit (Tx) beam-sweeping on UL SRS transmissions across multiple UL SRS Resources may be used.

As with UEs, base stations are not expected to blindly perform detection of UL PRS signals. The expected UL PRS configuration, as described above, may be provided to the UE, e.g., in assistance data. The UE may then transmit UL PRS signals consistent with the UL PRS configuration that the base stations are expecting. The base stations receive the UL PRS signals from the UE and generate positioning measurements based on the received signals and the expected UL PRS configuration. The positioning measurements are reported to the location server or the UE for position estimation.

A UE, however, may be unable to transmit UL PRS signals in accordance with the expected UL PRS configuration. If the UE fails to transmit the UL PRS signals with the expected PRS configuration, positioning measurements performed by the base stations will be inaccurate as they will be based on the expected UL PRS configuration. In accordance with an implementation, the UE may send a reference signal transmission report to a network entity, such as a location server, another base station, or a transmission reception point (TRP), indicating that the UL PRS signals were not transmitted according to expected UL PRS configuration.

A UE may fail to transmit the UL PRS signals in accordance with the expected UL PRS configuration in various manners. For example, the UE may not be able to transmit the UL PRS signals at all, may transmit the UL PRS signals with lower power than configured, may transmit the UL PRS signals on a different beam than configured, or a combination thereof. Thus, the reference signal transmission report provided by the UE may identify the manner in which the UL PRS signals were not in accordance with the expected UL PRS configuration, e.g., the UE may not be able to transmit the UL PRS signals at all, may transmit the UL PRS signals with lower power than configured, may transmit the UL PRS signals with a different spatial relation, i.e., on a different beam, than configured, or a combination thereof.

Moreover, there may be a variety of reasons that the UE cannot transmit the UL PRS signals in accordance with the expected UL PRS configurations. The reasons that the UL PRS signals are not transmitted in accordance with the expected UL PRS configurations may be dynamic, i.e., the location server cannot know beforehand that the UL PRS signals will not be transmitted in accordance with the expected UL PRS configurations. In accordance with an implementation, the reference signal transmission report from the UE may additionally provide reasons why the UL PRS signals were not transmitted according to expected UL PRS configuration.

For example, the UE may be unable to transmit the UL PRS signals because the UE is in the process of a serving Cell change, i.e., handover. For example, the UE may be in reconfiguration mode due to the Cell change and is unable to transmit the UL PRS signals. The UE may be unable to transmit the UL PRS signal due to collision with a DL symbol. The UE may be unable to transmit the UL PRS signal due to collision with another UL PHY channel, e.g., the colliding UL PHY channel may have a higher priority for transmission. The UE may be unable to transmit the UL PRS signal due to being outside the active bandwidth part of the UE. For example, the wideband spectrum in the NR network may be divided into multiple, e.g., four, non-overlapping sub-bands, where one sub-band may be assigned to the BWP of the UE, and the UL PRS signal is configured to be in a different sub-band. The UE may be unable to transmit the UL PRS signal due to interruption caused by uplink or downlink RF retuning time. For example, during carrier switching or during an UL and/or DL retuning phase, rf-RetuningTimeUL and/or rf-RetuningTimeDL, the UE is unable to transmit UL PRS signals. The UE may be unable to transmit the UL PRS signal due to the UE being in an idle mode, such as discontinuous reception (DRX) mode. For example, DRX is a mechanism in which the UE goes into a "sleep" mode for a certain period of time and "wakes up" for another period of time. If the UL PRS signal is configured to be transmitted during a "sleep" period, the UE cannot transmit the UL PRS signal.

The UE may transmit the UL PRS signals, but the transmission may not be in accordance with the expected UL PRS configuration. For example, the UE may transmit the UL PRS signals but with lower power than is expected, i.e., not in accordance with the UL PRS configuration. For example, the UE may transmit the UL PRS signals with lower power than expected due to carrier aggregation uplink power limitations. For example, if the UE is transmitting on a primary component carrier and a secondary component carrier, the total uplink power of a UE is limited and the DL PRS transmission may be transmitted with reduced power. The UE may transmit the UL PRS signals with lower power than expected due to Dual Connectivity (DC). For example, similar to carrier aggregation uplink power limitations, the total uplink power of a UE may be limited when the UE transmits and receives signals on multiple component carriers and the DL PRS transmission may be transmitted with reduced power. The UE may transmit the UL PRS signals with lower power than expected due to Maximum Permissible Exposure (MPE), e.g., safety limitations due to the use of FR2. Additionally, the UE may transmit the UL PRS signals with lower power or not transmit the UL PRS signal due to being in a low battery state.

The may transmit the UL PRS signals on a beam that is different than expected. For example, in FR2, the UE may transmit the UL PRS signals but not use the spatial-Tx-Reference that is configured due to collision with a Tx beam of a higher priority channel.

In accordance with an implementation, the reference signal transmission report by the UE may provide additional information with respect to the UL PRS signals that were not transmitted according to expected UL PRS configuration. For example, the UE may indicate the slot ID or subframe ID or frame ID that contains the UL PRS signals for positioning that were affected. The UE may indicate the resource ID, or resource set ID of the UL PRS signal that were affected. If a UE was not able to transmit the UL PRS signal according to the expected spatial relation configuration, e.g., on a specific Tx-beam, the UE may indicate that the Reference ID of a DL signal (e.g. SSB or DL PRS or CSIRS) that is configured for the spatial relation between a reference signal from the transmission-reception point and the UL PRS signal. For example, if the UL PRS is transmitted with a different beam than the one configured, the UE may report which beam was used. The UE may indicate the Reference ID of a DL signal that is configured for path loss determination between a reference signal from the transmission-reception point and the UL PRS signal. The UE may indicate the symbols, or a group of symbols of the UL PRS signals that were affected. If there was collision with another UL channel, the UE may indicate the type of channel of the affected UL PRS, or whether the UL channel is periodic, semi-persistent, or aperiodic. The UE may provide information relative to the idle mode, e.g., the DRX configuration.

Figure 3:
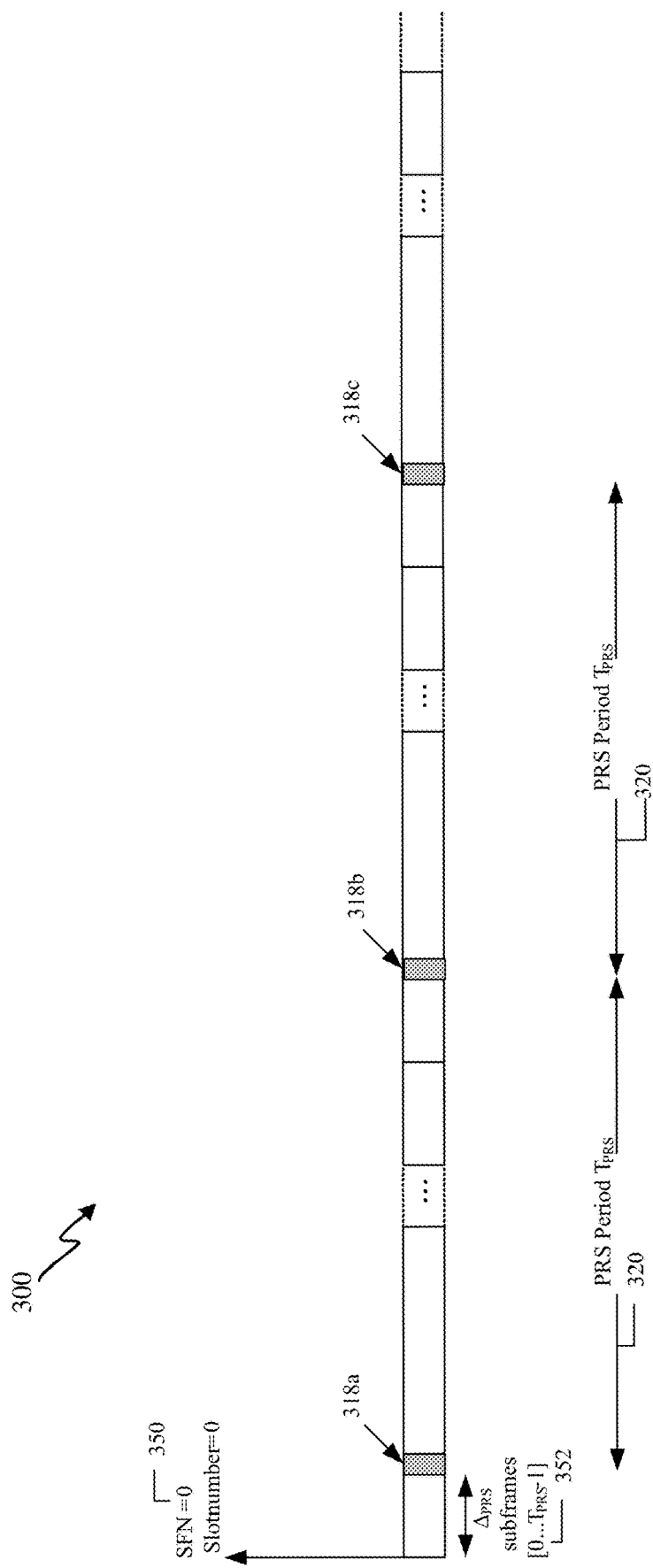
FIG. 3 illustrates an exemplary PRS configuration for a cell supported by a wireless node (TRP).

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity ($TRP_S$) 320. Typically, the cell specific PRS subframe configuration is defined by a "PRS Configuration Index" $I_{PRS}$ included in the OTDOA assistance data. The PRS Periodicity ($TRP_S$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS} - 160$ |

TABLE 1-continued

| PRS configuration Index $I_{PRS}$ | PRS periodicity $T_{PRS}$ (subframes) | PRS subframe offset $\Delta_{PRS}$ (subframes) |
|---|---|---|
| 480-1119 | 640 | $I_{PRS}$ – 480 |
| 1120-2399 | 1280 | $I_{PRS}$ – 1120 |
| 2400-2404 | 5 | $I_{PRS}$ – 2400 |
| 2405-2414 | 10 | $I_{PRS}$ – 2405 |
| 2415-2434 | 20 | $I_{PRS}$ – 2415 |
| 2435-2474 | 40 | $I_{PRS}$ – 2435 |
| 2475-2554 | 80 | $I_{PRS}$ – 2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0, \quad \text{eq. 1}$$

where $n_f$ is the SFN with $0 \leq n_f \leq 1023$, $n_s$ is the slot number within the radio frame defined by $n_f$ with $0 \leq n_s \leq 19$, TRPs is the PRS periodicity 320, and $\Delta_{PRS}$ is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity $TRP_S$ 320 and PRS subframe offset $\Delta_{PRS}$ using Table 1. The UE 115 may then determine the radio frame, subframe and slot when a PRS is scheduled in the cell (e.g., using equation (1)).

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $TRP_S=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $TRP_S$ (e.g., less than 160 ms), up to the full duty cycle (i.e., $N_{PRS}=TRP_S$), may also be used in later versions of LPP according to 3GPP TS 36.355. A directional PRS may be configured as just described according to 3GPP TSs and may, for example, use a low PRS duty cycle (e.g., $N_{PRS}=1$, $TRP_S=160$ subframes) or a high duty cycle.

A New Radio (NR) DL PRS resource may be defined as a set of resource elements used for NR DL PRS transmission that can span multiple PRBs within N (1 or more) consecutive symbol(s) within a slot. In any OFDM symbol, a PRS resource occupies consecutive PRBs.

A DL PRS Resource Set may be defined as a set of DL PRS Resources, where each DL PRS Resource has a DL PRS Resource ID. The DL PRS Resources in a DL PRS Resource set are associated with the same TRP. A DL PRS Resource ID in a DL PRS Resource set may be associated with a single beam transmitted from a single TRP, e.g., where the TRP may transmit one or more beams. It may be noted that this does not have any implications on whether the TRPs and beams from which signals are transmitted are known to a UE.

A DL PRS occasion may be one instance of periodically repeated time windows (consecutive slot(s)) where DL PRS is expected to be transmitted. A DL PRS configuration, e.g., including DL PRS transmission schedule, may be indicated to a UE for DL PRS positioning measurements. For example, the UE may not be expected to perform any blind detection of DL PRS configurations.

Figure 4:
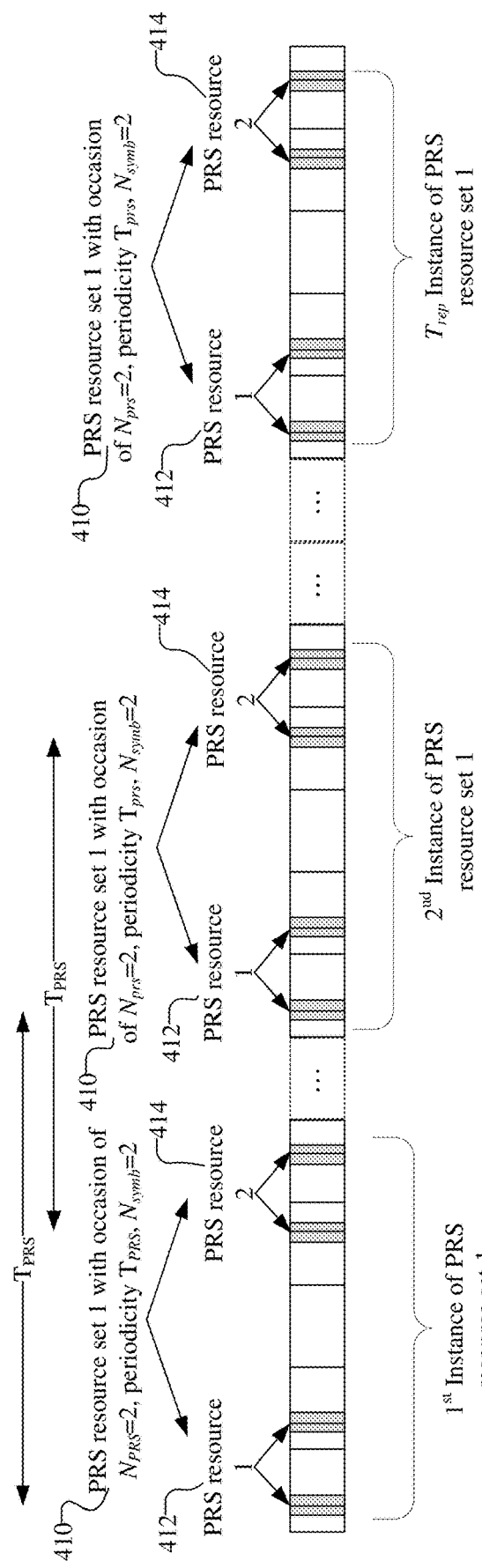
FIG. 4 illustrates an exemplary PRS configuration in a multi-beam system.

FIG. 4 illustrates an exemplary PRS configuration 400 in a multi-beam system. A base station 105, for example, may configure multiple PRS resource sets, each one associated with one periodicity, and transmitted across multiple occasions. As illustrated, a PRS resource set 1 410 may be defined as a set of PRS resources, including PRS resource 1 412 and PRS resource 2 414, which are sets of resource elements spanning multiple PRBs within N (1 or more) consecutive symbol(s) within a slot. Each of PRS resource 1 412 and PRS resource 2 414 has a DL PRS Resource ID and are both are associated with the same TRP, but may be transmitted on different beams. FIG. 4 illustrates a first instance 410a of PRS resource set 1 410, a second instance 410b of PRS resource set 1 410, and a $T_{rep}$ instance 410a of PRS resource set 1 410. The PRS resource set 1 410 is defined with an occasion of $N_{PRS}=2$, a periodicity $TRP_S$, and $N_{symb}=2$. FIG. 4 illustrates an example where one configured $T_{rep}$-bit muting pattern controls which occasion of the PRS resource is muted.

Downlink PRS may be preempted or punctured by higher priority traffic, such as ultra-reliable low-latency traffic (URLLC). This preemption may take the form of puncturing one or more symbols or bandwidth parts of the PRS with the URLLC data. Puncturing DL PRS with higher priority traffic is similar to puncturing one type of traffic, such as enhanced mobile broadband (eMBB) with URLLC, as supported by NR.

For example, ongoing eMBB transmissions may be punctured or interrupted to send higher priority URLLC transmission. Puncturing eMBB transmission may cause loss of phase coherence between the two eMBB transmit durations that have been made non-contiguous by the URLLC transmission. For example, on uplink (UL), the URLLC may have a different transmit power, which may cause loss of phase coherence. The URLLC may be scheduled in a different component carrier (CC) or bandwidth part (BWP). If the UE has to tune-away the radio frequency to receive (on DL) or transmit (on UL) the URLLC and then tune-back for eMBB, it may cause loss of phase coherence.

With punctured transmissions, indication-based multiplexing may be used to indicate when puncturing is occurring or has occurred, which is beneficial for both URLLC and eMBB UEs at the cost of indicator overhead.

Figure 5A:
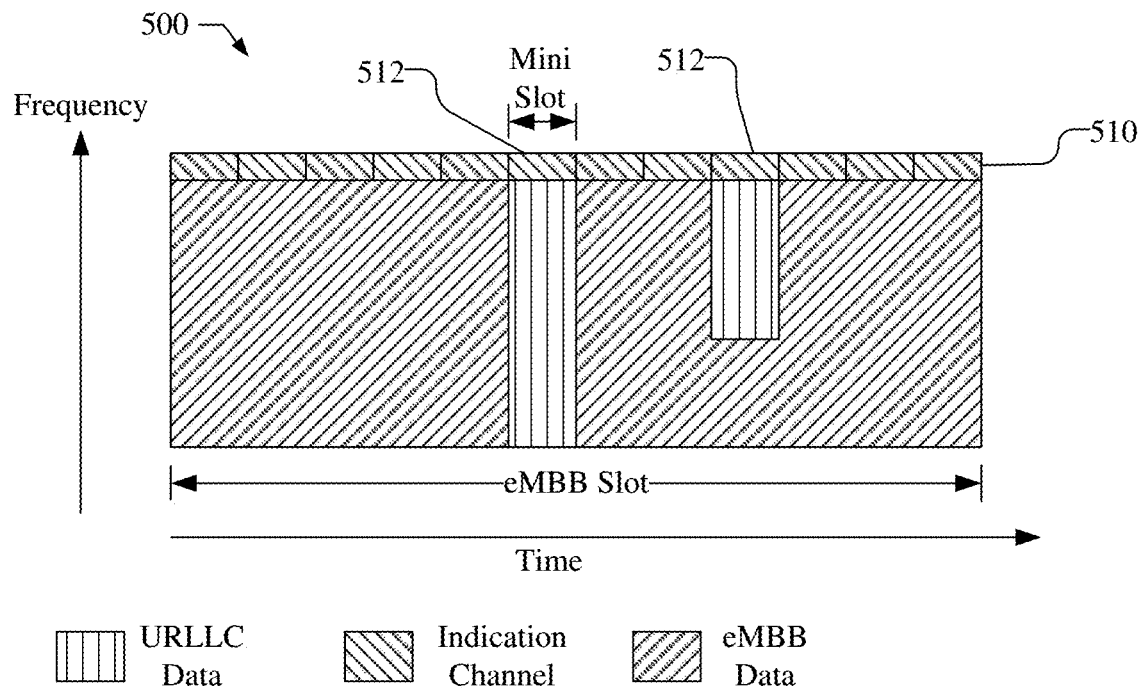
FIG. 5A is a diagram illustrating a current preemption indication of URLLC/eMBB dynamic multiplexing.

FIG. 5A illustrates a diagram 500 showing aspects in connection with DL URLLC/eMBB dynamic multiplexing and current indication design. In FIG. 5A, an indication 512 is provided that eMBB data is punctured by URLLC. The indication 512 is current with respect to any URLLC that punctures the eMBB, e.g., the indication 512 is transmitted on the indication channel 510 whenever puncturing by URLLC occurs. The indication channel 510 shown in FIG. 5A is frequency-division multiplexed (FDM) with the actual slot.

Figure 5B:
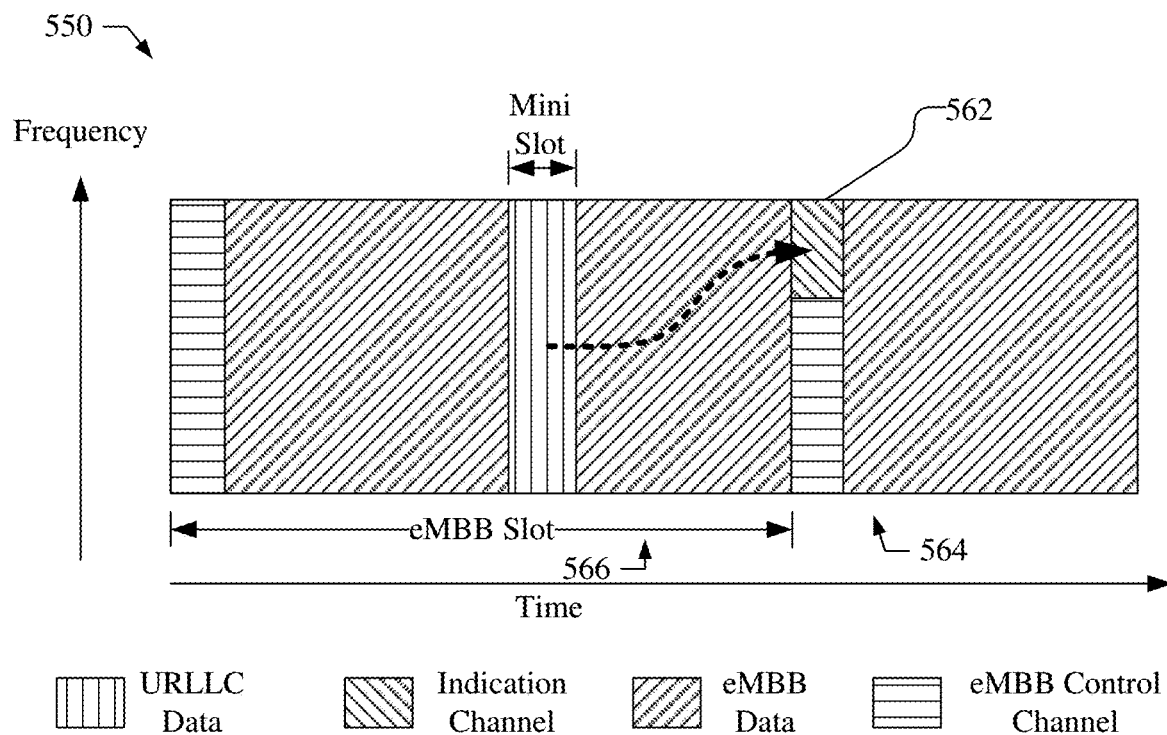
FIG. 5B is a diagram illustrating a post indication of URLLC/eMBB dynamic multiplexing.

FIG. 5B illustrates another diagram 550 showing aspects in connection with DL URLLC/eMBB dynamic multiplexing and indication design. In FIG. 5B, an indication 562 is provided that eMBB data is punctured by URLLC, but is provided after both the URLLC and the eMBB data. The indication 562 is a post-indication for both URLLC and the eMBB. For example, the indication 562 may be transmitted in an eMBB slot 564 subsequent to an eMBB slot 566 in which the puncturing occurs.

Figure 5C:
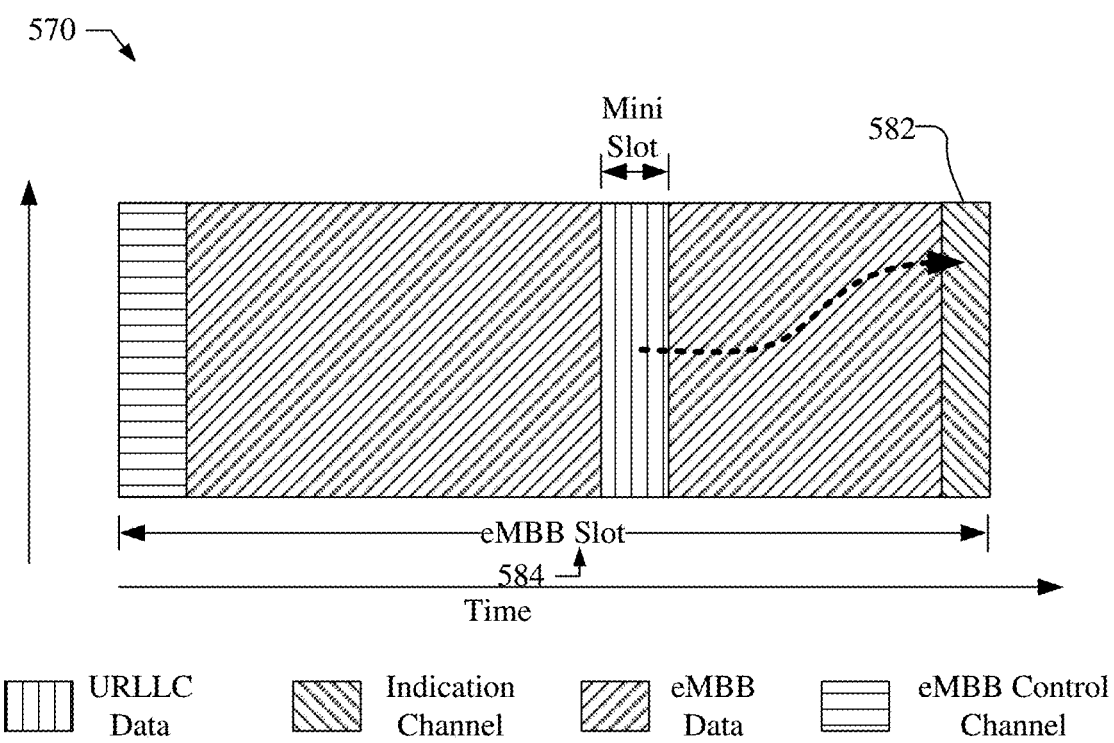
FIG. 5C is a schematic diagram of another post indication of URLLC/eMBB dynamic multiplexing.

FIG. 5C illustrates another diagram 570 showing aspects in connection with DL URLLC/eMBB dynamic multiplexing and indication design. In FIG. 5C, an indication 582 is provided that eMBB data is punctured by URLLC. The indication 582 is a post-indication for the URLLC and current with respect to the eMBB, e.g., the indication 582 may be transmitted within the eMBB slot 584 that is punctured.

A downlink preemption indication (DL PI) may be provided in a Downlink Control Information (DCI). For example, as discussed in 3GPP Technical Specification (TS) 38.213, DCI format 2_1 may be used to provide a downlink preemption indication. The DCI format 2_1 may be used for notifying the PRB(s) and OFDM symbol(s) where the UE may assume no transmission is intended for the UE. For example, a base station 105 may schedule an eMBB UE during a slot. In the middle of the slot a packet for a URLLC UE arrives, and base station 105 schedules and transmits the packet to the URLLC UE in a subset of RB s/slots. The base station 105 indicates via DL PI (e.g., in the next slot) to the eMBB UE which part of RB s/symbols are punctured (used for the URLLC UE). The eMBB UE may use the information in the DL PI to enhance the decoding of the received eMBB, e.g., the information increases the chance of decoding.

By way of example, the DCI format 2_1 with CRC scrambled by Interruption Radio Network Temporary Identifier (INT-RNTI) may provide multiple preemption indications, e.g., Preemption indication 1, Preemption indication 2, ..., Preemption indication N. The size of DCI format 2_1 is configurable by higher layers up to 126 bits. Each preemption indication may be, e.g., 14 bits. For each UE, different preemption indications may correspond to different component carriers (serving cells).

Figure 6:
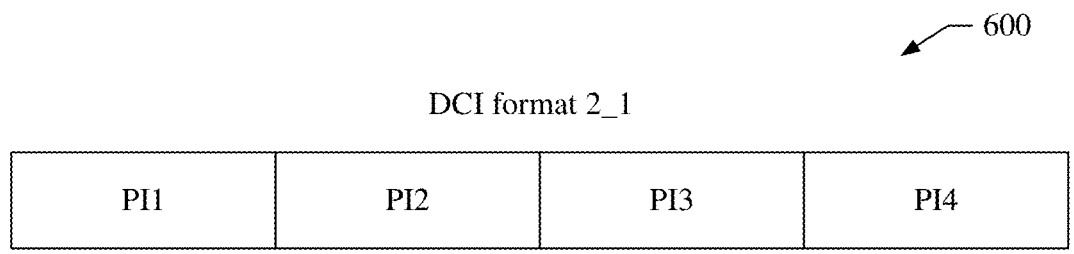
FIG. 6 illustrates an example of a Downlink Control Information (DCI) format 2_1, used to provide preemption indication (PI) for DL transmissions.

FIG. 6 illustrates an example of a DCI format 2_1 600, which includes preemption indication 1 (PI1), preemption indication 2 (PI2), preemption indication 3 (PI3), and preemption indication 4 (PI4). The DCI format 2_1 600 is group common, but the interpretation may be different for different UEs. For example, for a first UE, component carrier 1 (CC1) may be indicated by PI1, component carrier 2 (CC2) may be indicated by PI2, and component carrier 3 (CC3) may be indicated by PI4; while for a second UE, CC1 may be indicated by PI3; and for a third UE, CC1 may be indicated by PI1 and CC2 may be indicated by PI2.

A DownlinkPreemption information element (IE) that may be used to configure a UE to monitor physical downlink control channel (PDCCH) for the INT-RNTI (interruption) is illustrated in Table 2. The definition in Table 2 is based on a fragment of Abstract Syntax Notation One (ASN.1).

TABLE 2

```
--ASN1START
--TAG-DOWNLINKPREEMPTION-START
DownlinkPreemption ::=              SEQUENCE {
   int-RNTI                         RNTI-Value,
   timeFrequencySet                 ENUMERATED {set0, set1},
   dci_PayloadSize                  INTERGER (0..maxINT-DCI-
PayloadSize,
   int-ConfigurationPerServingCell  SEQUENCE (SIZE
(1..maxNrofServingCells)) OF INT-ConfigurationPerServingCell,
   ...
}
INT-ConfigurationPerServingCell::=  SEQUENCE {
   servingCellId                    ServingCellIndex,
   positionInDCI                    INTEGER (0..maxINT-DCI-
PayloadSize-1)
}
--TAG-DOWNLINKPREEMPTION-STOP
--ASN1STOP
```

Consistent with 3GPP TS 38.213, in Table 2, the DownlinkPreemption fields descriptions includes the dci-PayloadSize, which may be the total length of the DCI payload scrambled with INT-RNTI. The int-ConfigurationPerServingCell indicates, per serving cell, the position of the 14 bit INT values inside the DCI payload. The int-RNTI is a RNTI used for indication of preemption in DL. The timeFrequencySet may set selection for DL preemption indication. The set determines how the UE interprets the DL preemption DCI payload. The INT-ConfigurationPerServingCell field descriptions includes positionInDCI, which is the starting position (in number of bit) of the 14 bit INT value applicable for this serving cell (servingCellId) within the DCI payload, which must be in multiples of 14 bits.

As described in 3GPP TS 38.213, if a UE is provided DownlinkPreemption, the UE is configured with an INT-RNTI provided by int-RNTI for monitoring PDCCH conveying DCI format 2_1. The UE is additionally configured with a set of serving cells by int-ConfigurationPerServingCell that includes a set of serving cell indexes provided by corresponding servingCellId and a corresponding set of locations for fields in DCI format 2_1 by positionInDCI, an information payload size for DCI format 2_1 by dci-PayloadSize, and an indication granularity for time-frequency resources by timeFrequencySet. If a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The indication by the DCI format 2_1 is not applicable to receptions of SS/PBCH blocks.

If a UE detects a DCI format 2_1 in a PDCCH transmitted in a control resource set (CORESET) in a slot, the set of symbols is the last $N_{symb}^{slot} \cdot T_{INT} \cdot 2^{\mu-\mu_{INT}}$ symbols prior to the first symbol of the CORESET in the slot where $T_{INT}$ is the PDCCH monitoring periodicity provided by the value of monitoringSlotPeriodicityAndOffset, as described in Subclause 10.1 of 3GPP TS 38.213, $N_{symb}^{slot}$ is the number of symbols per slot, μ is the subcarrier spacing (SCS) configuration for a serving cell with mapping to a respective field in the DCI format 2_1, $\mu_{INT}$ is the SCS configuration of the DL BWP where the UE receives the PDCCH with the DCI format 2_1. If the UE is provided tdd-UL-DL-ConfigurationCommon, symbols indicated as uplink by tdd-UL-DL-ConfigurationCommon are excluded from the last $N_{symb}^{slot} \cdot T_{INT} \cdot 2^{\mu-\mu_{INT}}$ symbols prior to the first symbol of the CORESET in the slot. The resulting set of symbols includes a number of symbols that is denoted as $N_{INT}$.

Figure 7:
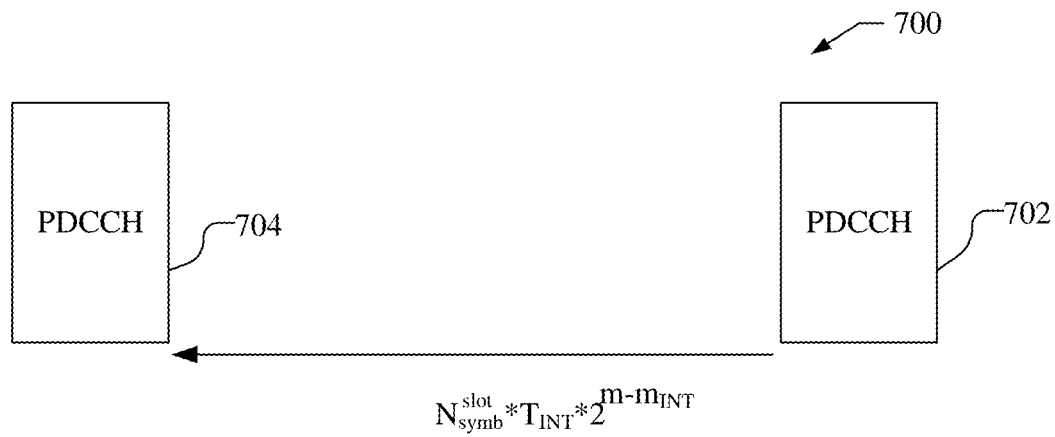
FIG. 7 illustrates a diagram showing aspects of determination of URLLC punctured eMBB symbols based on a detected DL PI.

FIG. 7 illustrates a diagram 700 showing aspects of determination of URLLC punctured eMBB symbols based on a detected DL PI, e.g., DCI format 2_1, in a monitoring occasion, e.g., PDCCH 702. As illustrated, if a UE detects a DL PI in a monitoring occasion, the UE may determine which symbols in the slot are punctured by counting all symbols between the two monitoring occasions, e.g., PDCCH 702 and 704 and counting back all symbols in the slot to the last $N_{symb}^{slot} \cdot T_{INT} \cdot 2^{\mu-\mu_{INT}}$ symbols prior to the first symbol of the CORESET. As discussed above, if the UE is provided tdd-UL-DL-ConfigurationCommon, symbols indicated as uplink by tdd-UL-DL-ConfigurationCommon are excluded from the last $N_{symb}^{slot} \cdot T_{INT} \cdot 2^{\mu-\mu_{INT}}$ symbols prior to the first symbol of the CORESET in the slot, where $N_{symb}^{slot}$ is the total number of symbols between monitoring occasions 702 and 704.

The signaling for TRP IDs, PRS resource sets, and PRS resources, is illustrated in Tables 3, 4, and 5, respectively, which are based on fragments of Abstract Syntax Notation One (ASN.1). In Table 3, the IE NR-TRP-ID specifies an identity of an NR TRP.

TABLE 3

```
--ASN1START
NR-TRP-ID-r16 ::= SEQUENCE {
    nrPhysCellId-r16        INTEGER (0..1007)       OPTIONAL,
    nrARFCN-r16             ARFCN-ValueNR-r15       OPTIONAL,
    nrCellGlobalID-r16      CHOICE {
        withoutPLMN-r16         BIT STRING (SIDE (36)),
        withPLMN-r16            NCGI-r15
    }                                               OPTIONAL
    nrTRP-ID-r16            INTEGER (FFS)           OPTIONAL
    ...
}
--ASN1STOP
```

In Table 4, the IE NR-DL-PRS-Info specifies a DL PRS Resource Set.

TABLE 4

```
--ASN1START
NR-DL-PRS-Info-r16 ::= SEQUENCE {
    dl-PRS-ResourceSet-r16   SEQUENCE (SIZE(1..maxResourceSets-
r16)) OF DL-PRS-ResourceSet-r16,
    ...
}
DL-PRS-ResourceSet-r16 ::= SEQUENCE {
    --parameters applicable per resource set: TBD
    dl-prs-resourceSetId-r16  INTEGER (FFS),
    dl-PRS-Resources-r16      SEQUENCE (SIZE(1..maxResources-r16))
OF DL-PRS-Resource-r16,
    ...
}
DL-PRS-Resource-r16 ::= SEQUENCE {
    --parameters applicable per resource: TBD
    dl-PRS-ResourceId-r16    INTEGER (FFS),
    ...
}
--ASN1STOP
```

In Table 5, the IE NR-DL-PRS-AssistanceData is used to provide DL PRS configuration information for NR TRPs.

TABLE 5

```
--ASN1START
NR-DL-PRS-AssistanceData-r16 ::= SEQUENCE {
    referenceTRP-Info-NR-r16     Reference TRP-Info-NR-r16,
    neighbourTRP-Info-NR-r16     NeighbourTRP-InfoList-NR-r16,
    ...
}
ReferenceTRP-Info-NR-r16 ::= SEQUENCE {
    nrTRP-ID-Ref-r16            NR-TRP-ID-r16
    nrPRS-Info-Ref-r16          NR-DL-PRS-Info-r16
    ...
}
NeighbourTRP-InfoList-NR-r16 ::= SEQUENCE (SIZE(0..maxTRP-1-r16)) OF
                                NeighborTRP-InfoElement-NR-r16
NeighbourTRP-InfoElement-NR-r16 ::= SEQUENCE {
    nrTRP-ID-Neighbor-r16       NR-TRP-ID-r16,
    nrPRS-Info-Neighbor-r16     NR-DL-PRS-Info-r16,
    expectedTDOA                INTEGER (FFS)  OPTIONAL, --Cond TOA
    expectedTDOA-Uncertainty    INTEGER (FFS)  OPTIONAL, --Cond TOA
    prs-only-tp-r14             ENUMERATED{true} OPTIONAL, --Cond TOA
    ...
}
--ASN1STOP
```

Similar to puncturing eMBB traffic with URLLC data, discussed above, DL PRS may also be preempted or punctured by higher priority traffic, such as URLLC. The preemption of DL PRS may take the form of puncturing one or more symbols or bandwidth parts of the PRS with the URLLC data. A PRS preemption indication (PI) may be provided by a TRP, e.g., by the serving TRP, to provide notice that DL PRS from one or more TRPs has been preempted by another transmission that has higher priority than the preempted DL PRS, e.g., URLLC. For example, the PRS PI may be for a group of TRPs, where the group may include one or more TRPs, e.g., including the serving TRP and/or neighbor TRPs. Thus, a PRS PI provided by one TRP, e.g., the serving TRP, may provide notice that DL PRS from a different TRP, or a plurality of TRPs, has been preempted by another transmission.

The PRS PI may include an identifier for the group of TRPs, e.g., an identifier associated with one or more TRPs. The PRS PI may further identify symbols, e.g., OFDM symbols, of the configured PRS transmissions that are affected. The PRS PI may further identify frequency sub-bands of the configured PRS transmissions that are affected. Based on the received PRS PI, the UE may assume that the identified symbols and frequency sub-bands in the DL PRS transmitted by the identified TRP or group of TRPs is preempted. The UE may further assume the remaining DL PRS from the identified TRP or group of TRPs, or from other TRPs, are not preempted and may receive and process those DL PRS for positioning measurements.

In one implementation, the PRS PI may be similar to the DL PI, discussed above. The PRS PI, for example, may be in a group common DCI, but the interpretation may be different for different UEs. The PRS PI may be a Downlink Control Information (DCI), similar to DCI format 2_1 discussed above. The PRS PI, for example, may be 14 bits, although additional bits may be used, as discussed further below.

Figure 8:
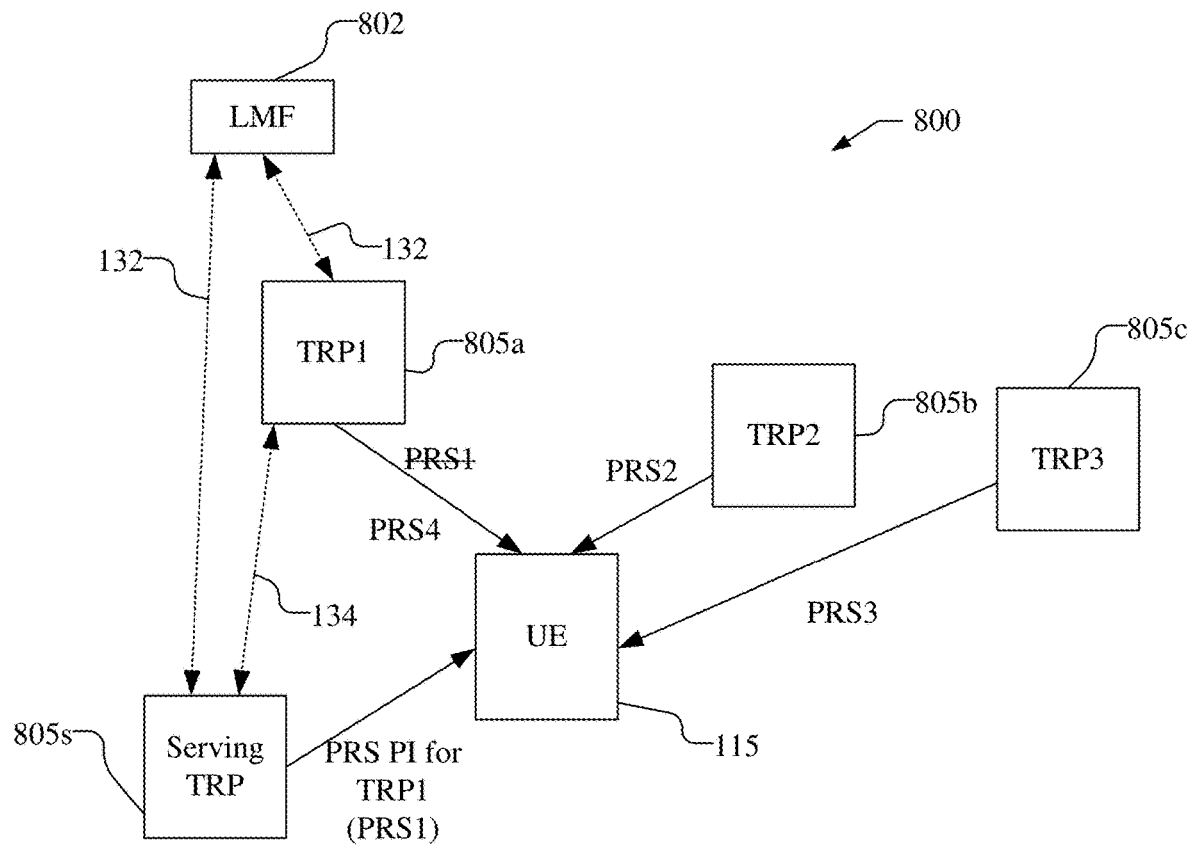
FIG. 8 illustrates an example of a wireless communications system in which PRS PI is provided to provide notice that DL PRS from a TRP has been preempted by another transmission that has higher priority than the preempted DL PRS.

FIG. 8 illustrates an example of a wireless communications system 800 in which PRS PI is provided to provide notice that PRS from a TRP has been preempted by another transmission that has higher priority than the preempted PRS. FIG. 8, for example, illustrates a UE 115 during a positioning session in which PRS transmissions are received from a plurality of TRPs, e.g., TRP1 805a, TRP2 805b, and TRP3 805c, and is in communication with a serving TRP 805s. In some implementations, the TRPs 805 may be base stations such as base stations 105 shown in FIG. 1 and the PRS may be DL PRS. In another implementation, the TRPs 805 may be sidelink UEs, such as UEs 115 shown in FIG. 1, and the PRS may be SL PRS. In another implementation, the TRPs may be a combination of base stations 105 and sidelink UEs 115, and the PRS may be a combination of DL PRS and SL PRS.

As illustrated, the UE 115 is configured to receive a number of DL PRS transmissions from the TRPs, e.g., PRS1 and PRS4 from TRP1 805a, PRS2 from TRP2 805b, and PRS3 from TRP3 805c. The UE 115 may further be configured to receive DL PRS transmissions from the serving TRP 805s. As indicated by strikethrough, PRS1 from TRP1 805a, is preempted by another transmission that has higher priority that PRS1, e.g., URLLC. If UE 115 attempted to perform a positioning measurement using preempted PRS1 transmission from TRP1 805a, a resulting positioning estimate for UE 115 based on that positioning measurement may be in error.

Accordingly, TRP1 805a may indicate to the serving TRP 805s that PRS1 is preempted. For example, TRP1 805a may communicate the preemption of PRS1 to the serving TRP 805s either directly using backhaul 134 or indirectly through a core network entity, such as LMF 802, using backhauls 132.

In some implementations, the serving TRP 805s may provide a PRS PI to the UE 115 indicating that that PRS1 from TRP1 805a has been preempted. For example, the PRS PI from the serving TRP 805s may identify the affected TRP, e.g., TRP1 805a, as well as the OFDM symbol in the configured PRS transmissions affected by the preemption. Moreover, the PRS PI from the serving TRP 805s may identify specific frequency sub-bands in the configured PRS transmissions affected by the preemption.

UE 115 receives the PRS PI for TRP1 from the serving TRP 805s, and accordingly excludes the configured PRS1 transmission from positioning measurements. The UE 115 may receive the PRS transmissions from the other TRPs, e.g., TRP2 805b and TRP3 805c, as well as the PRS4 transmission from TRP1 805a, and use those received PRS transmissions for positioning measurements.

Figure 9:
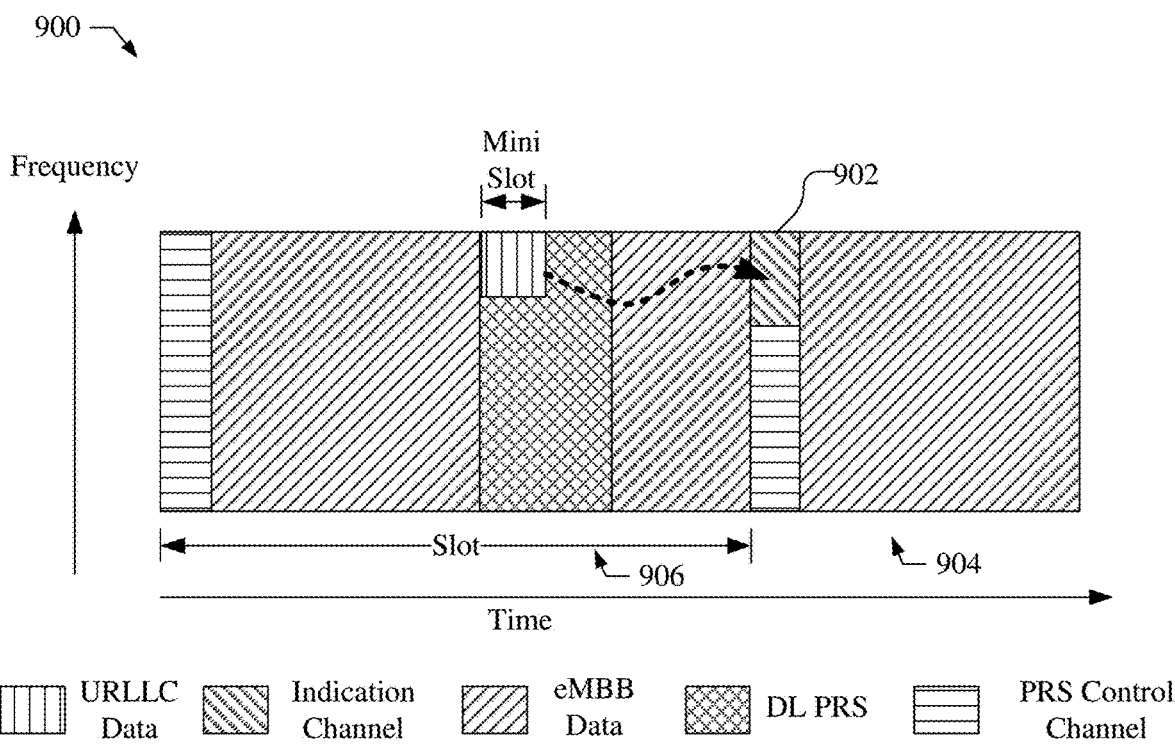
FIG. 9 illustrates a diagram showing aspects in connection with DL PRS preemption by URLLC and preemption indication.

FIG. 9 illustrates a diagram 900 showing aspects in connection with DL PRS preemption by URLLC and indication design. FIG. 9 is similar to FIG. 5B, but instead of puncturing eMBB data, as illustrated in FIG. 5B, DL PRS is punctured by URLLC. In FIG. 9, a post indication 902, e.g., PRS PI, is provided that DL PRS is punctured by URLLC, e.g., after both the URLLC and the DL PRS. For example, the indication 902 may be transmitted in a slot 904 subsequent to the slot 906 in which the puncturing occurs. If desired, a current indication, similar to that shown in FIG. 5A, or a post indication that is in the same slot as the slot in which the puncturing occurred, e.g., as illustrated in FIG. 5C, may be used.

It should be understood that FIG. 9 illustrates the indication 902 as being provided by the same TRP that is transmitting the URLLC data that preempts the DL PRS transmission. As discussed above, however, the indication 902 may be provided by a separate TRP, e.g., the indication 902 is provided by a serving TRP and indicates that a DL PRS transmission from a neighbor TRP is punctured. The indication 902 may identify from which TRP or TRP groups that DL PRS transmissions are punctured. The indication 902 may additionally identify the symbol or symbols of the DL PRS that are punctured. As illustrated in FIG. 9, the URLLC may preempt only a portion of the frequency sub-bands of the DL PRS. The indication 902 may further identify the frequency sub-bands that are punctured.

The PRS PI may use a number of bits to identify which group of symbols, in which bandwidth, and from which TRP the DL PRS is punctured. For example, the PRS PI may use a 14 bit indication that can be associated with an identifier for the TRP (or a group of TRPs) and frequency layer, e.g., as configured at the UE 115 through LPP. For example, for a 126 bit PRS PI, using 14 bits associated with each PRS Radio Network Temporary Identifier (RNTI), a total of 9 (=126/14) TRPs may be indicated that at some point during the monitoring occasion had their DL PRS punctured.

For each TRP that is transmitting a PRS, the set of symbols that are punctured may be identified based on a number of bits between two monitoring occasions, wherein only bits in symbols that contain DL PRS are counted. For example, the set of symbols may be identified as the last $N_{symb}^{slot} \cdot T_{INT} \cdot 2^{\mu-\mu_{INT}}$ symbols prior to the first symbol of monitoring occasion, e.g., PDCCH, where TINT is the PDCCH monitoring periodicity, $N_{PRSsymb}^{slot}$ is the number of PRS symbols per slot, $\mu$ is the numerology of the PRS resources of the TRP, and $\mu_{INT}$ is the configuration of the PRS BWP where the UE receives the PDCCH.

Figure 10:
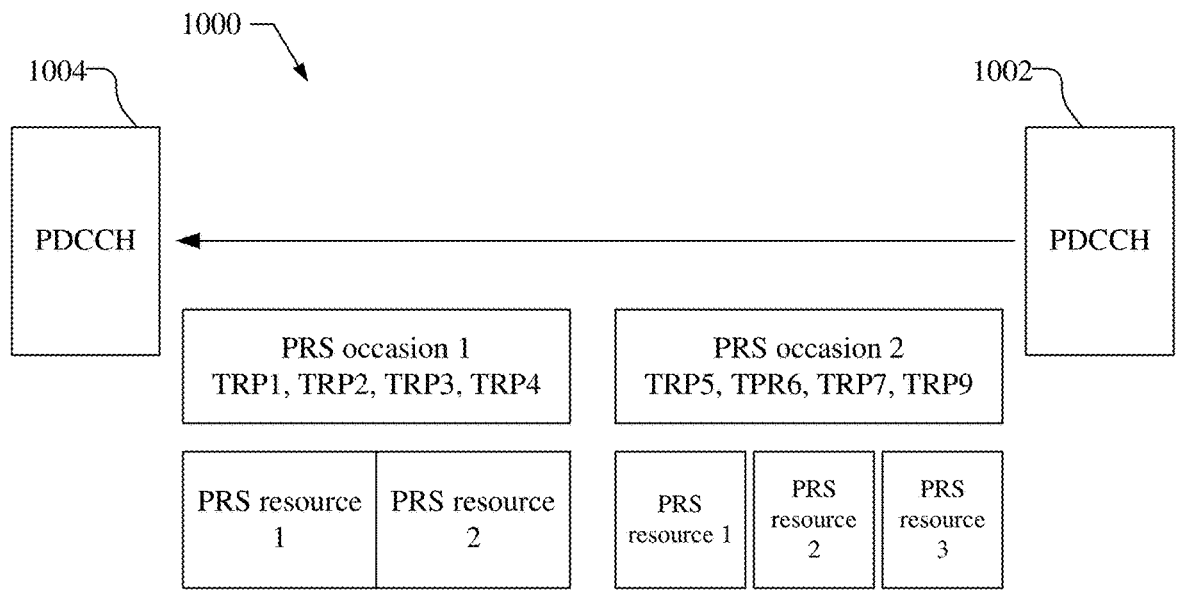
FIG. 10 illustrates a diagram showing aspects of determination of URLLC punctured DL PRS symbols based on a detected PRS PI in a monitoring occasion.

FIG. 10 illustrates a diagram 1000 showing aspects of determination of URLLC punctured DL PRS symbols based on a detected PRS PI in a monitoring occasion, e.g., PDCCH 1002. As illustrated, if a UE detects a PRS PI in a monitoring occasion, the UE may determine which symbols are punctured by counting all PRS symbols between the two monitoring occasions, e.g., PDCCH 1002 and 1004 and counting back all symbols in the slot to the last $N_{symb}^{slot} \cdot T_{INT} \cdot 2^{\mu - \mu_{INT}}$ symbols prior to the monitoring occasion 1002. As illustrated in FIG. 10, there are two PRS occasions, PRS occasion 1 1010, which includes TRP1, TRP2, TRP3, TRP4, and PRS resource 1 and PRS resource 2, and PRS occasion 2 1020, which includes TRP5, TRP6, TRP7, and TRP9 and PRS resource 1, PRS resource 2, and PRS resource 3. Only the symbols of the PRS resources in PRS occasion 1 1010 and PRS occasion 2 1020 are counted to determine $N_{PRSsymb}^{slot}$.

The PRS PI may also use the number of bits, e.g., 14 bits, to identify the frequency sub-bands of the DL PRS that is punctured. For example, the PRS PI may be similar to the DCI format 2_1, discussed above, and may include a timeFrequencySet similar to that shown in Table 2, which may provide an indication of the frequency sub-bands affected by preemption. For example, if the value of timeFrequencySet is 0, 14 bits of a field in the PRS PI may have a one-to-one mapping with 14 groups of consecutive symbols from the set of symbols where each of the first $N_{INT} - \lfloor N_{INT} \rfloor \rceil 14$ symbol groups includes $\rceil N_{INT}/14 \lceil$ symbols, each of the last $14 - N_{INT} + \lfloor N_{INT}/14 \rfloor \rceil 14$ symbol groups includes $\lfloor N_{INT}/14 \rfloor$ symbols, a bit value of 0 indicates transmission to the UE in the corresponding symbol group and a bit value of 1 indicates no transmission to the UE in the corresponding symbol group.

In another example, if the value of timeFrequencySet is 1, 7 pairs of bits of a field in the PRS PI may have a have a one-to-one mapping with 7 groups of consecutive symbols where each of the first $N_{INT} - \lfloor N_{INT}/7 \rfloor \rceil 7$ symbol groups includes $\rceil N_{INT}/7 \lceil$ symbols, each of the last $7 - N_{INT} + \lfloor N_{INT}/7 \rfloor \rceil 7$ symbol groups includes $\lfloor N_{INT}/7 \rfloor$ symbols, a first bit in a pair of bits for a symbol group is applicable to the subset of first $\rceil N_{INT}/2 \lceil$ PRBs from the set of $B_{INT}$ PRBs, a second bit in the pair of bits for the symbol group is applicable to the subset of last $\lfloor B_{INT}/2 \rfloor$ PRBs from the set of $B_{INT}$ PRBs, a bit value of 0 indicates transmission to the UE in the corresponding symbol group and subset of PRBs, and a bit value of 1 indicates no transmission to the UE in the corresponding symbol group and subset of PRBs. The value $B_{INT}$ is the bandwidth of all the PRS resources of the frequency layer. If the bandwidth is not the same for all PRS resources, then $B_{INT}$ is the maximum bandwidth, and starts where the lowest PRS resource starts, and ends where the highest PRS ends.

Thus, using 14 bits, the PRS PI may identify one of two frequency sub-bands of the DL PRS that are preempted, i.e., either the first $\rceil B_{INT}/2 \lceil$ PRBs from the set of $B_{INT}$ PRBs, or the last $\lfloor B_{INT}/2 \rfloor$ PRBs from the set of $B_{INT}$ PRBs, or both.

Figure 11:
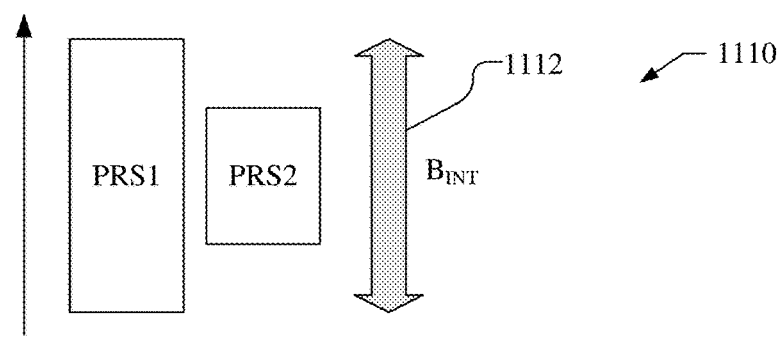
FIG. 11 illustrates examples of the frequency bandwidth of PRS resources and the corresponding maximum bandwidth.
Figure 11:
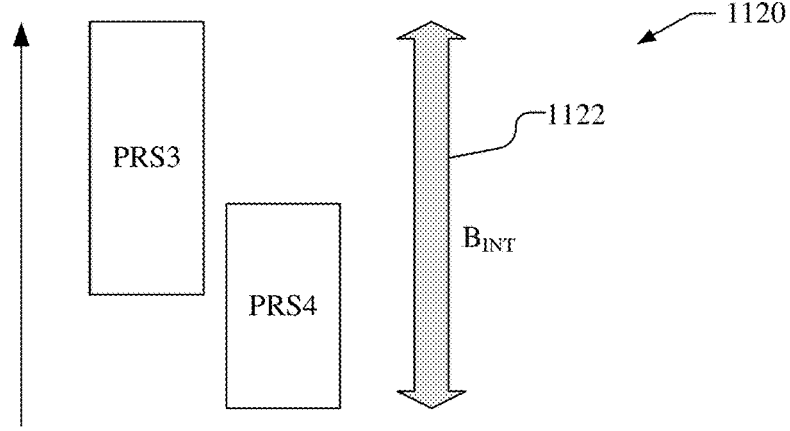

FIG. 11 illustrates examples 1110 and 1120 of the frequency bandwidth of PRS resources and the corresponding bandwidth $B_{INT}$. As illustrated in example 1110, the frequency bandwidths of PRS resources PRS1 and PRS2 completely overlap, and accordingly, the maximum bandwidth $B_{INT}$ 1112 is the bandwidth of the PRS resource with the largest frequency bandwidth, e.g., PRS 1. As illustrated in example 1120, the bandwidth is not the same for all PRS resources, e.g., PRS resource PRS3 includes higher frequencies not used by PRS resource PRS4 and, conversely, PRS resource PRS4 includes lower frequencies not used by PRS resource PRS3. The maximum bandwidth $B_{INT}$ 1122 in example 1120 then is the bandwidth starting at the lowest frequency of PRS resource PRS4 and ending with the highest frequency of PRS resource PRS3.

A high layer signaling of the PRS PI information element that may be used to configure a UE to monitor physical downlink control channel (PDCCH) for the PRS-RNTI (interruption) is illustrated in Table 6. The definition in Table 6 is based on a fragment of Abstract Syntax Notation One (ASN.1).

TABLE 6

```
--ASN1START
DownlinkPRS Preemption ::=      SEQUENCE {
   PRS-RNTI                     RNTI-Value,
   timeFrequencySet             ENUMERATED {set0, set1},
   dci_PayloadSize              INTERGER (0..maxINT-DCI-
PayloadSize,
   int-ConfigurationPerTRP      SEQUENCE (SIZE
(1..maxNrofTRPs)) OF INT-ConfigurationPerTRP,
   ...
}
INT-ConfigurationPerTRP ::=     SEQUENCE {
   trpId                        TRP-ID,
   positionInDCI                INTEGER (0..maxINT-DCI-
PayloadSize-1)
}
--ASN1STOP
```

The DownlinkPRSPreemption fields descriptions includes the dci-PayloadSize, which may be the total length of the DCI payload scrambled with PRS-RNTI. The int-ConfigurationPerTRP indicates, per TRP, the position of the 14 bit INT values inside the DCI payload. The PRS-RNTI is a RNTI used for indication of preemption in DL PRS. The timeFrequencySet may set selection for DL PRS preemption indication. The set determines how the UE interprets the DL PRS preemption DCI payload. The INT-ConfigurationPerTRP field descriptions includes positionInDCI, which is the starting position (in number of bit) of the 14 bit INT value applicable for this TRP (TRPId) within the DCI payload, which may be in multiples of 14 bits.

As discussed above, using 14 bits, the PRS PI may identify one or both of two frequency sub-bands of the DL PRS that are preempted. In one implementation, however, the frequency sub-bands of the DL PRS may be divided into four or more frequency bandwidths, and the PRS PI may identify at least one of these frequency bandwidths of the DL PRS that are preempted. For example, the PRS PI may use an increased number of bits, e.g., greater than 14 bits, to indicate preemption of DL PRS. With an increase in the number of bits, greater options are available for the timeFrequencySet, e.g., the enumerated sets may be increased. For example, the timeFrequencySet may be provided as follows:

| | |
|---|---|
| timeFrequencySet | ENUMERATED {set0, set1,set2}, |
| timeFrequencySet | ENUMERATED {set0, set1, set2, set3}, |

By way of example, if, instead of using 14 bits, as discussed above, the PRS PI includes a total of 15 bits, the PRS PI may identify different portions in the time domain of the DL PRS that are punctured and one or more of the frequency sub-bands of the DL PRS that are punctured. For example, with 15 bits, the timeFrequencySet may include 3 bits (set0, set1, set2) and there will be 5 bits sets, each of the 5 bits sets corresponds to a different portion in time domain. In one implementation, the bandwidth $B_{INT}$ may be split into three portions, where each of the 3 bits is associated with one of the three portions and may be used to indicate whether the associated sub-band of the bandwidth $B_{INT}$ PRBs has been puncture, i.e., the 3 bits may identify one or more of the three sub-bands of the bandwidth $B_{INT}$ PRB s as punctured. In another implementation, the $B_{INT}$ may be split into eight portions, with the 3 bits identifying one of the eight frequency sub-bands is punctured, e.g., 000 indicates the highest eighth of the $B_{INT}$ PRB s is punctured, and 111 indicates the lowest eighth of the $B_{INT}$ PRB s is punctured.

Similarly, if the PRS PI includes a total of 16 bits, the PRS PI may identify different portions in the time domain of the DL PRS that are been punctured and one or more of the frequency sub-bands of the DL PRS that are punctured. For example, with 16 bits, the timeFrequencySet may include 4 bits (set0, set1, set2, set3) and there will be 4 bits sets, each of the 4 bits sets corresponds to a different portion in time domain. In one implementation, the bandwidth $B_{INT}$ may be split into four portions, where each of the 4 bits is associated with one of the four portions and may be used to indicate whether the associated sub-band of the bandwidth $B_{INT}$ PRBs has been puncture, i.e., the 4 bits may identify one or more of the four sub-bands of the bandwidth $B_{INT}$ PRB s as punctured. In another implementation, the $B_{INT}$ may be split into sixteen portions, with 4 bits identifying one of the sixteen frequency sub-bands is punctured, e.g., with 0000 indicating the highest sixteenth of the $B_{INT}$ PRB s is punctured, and 1111 indicating the lowest sixteenth of the $B_{INT}$ PRBs is punctured.

Additional bits may be used in the PRS PI to indicate different portions in the time domain of the DL PRS that has been punctured and one or more frequency sub-bands of the DL PRS that are punctured. For example, in a generalized implementation, with a total of X bits in the PRS PI, the timeFrequencySet may include K bits (set0, set1, . . . setK−1) and there will be X/K bits sets, each of the X/K bits sets corresponds to a different portion in time domain, where the K bits may be used to indicate which one or more of the sub-bands of the bandwidth $B_{INT}$ PRB s are punctured. For example, in one implementation, $B_{INT}$ may be split into $2^K$ portions, and the K bits may be used to indicate which one (and only one) of the sub-bands is punctured.

In another implementation, $B_{INT}$ may be split into K portions, where each of the K bits is associated with one of the K portions and used to indicate whether the associated sub-band of the bandwidth $B_{INT}$ PRBs has been puncture. Thus, the K bits may be used to indicate which one or more of the sub-bands is punctured. For example, if K=4 bits, $B_{INT}$ may be split into 4 (K) portions, i.e., four frequency sub-bands may be identified, and each of the sub-bands may be indicated as punctured or not punctured, e.g., 0,1,0,1 would indicate that the $2^{nd}$ and $4^{th}$ sub-bands are punctured and the $1^{st}$ and $3^{rd}$ sub-bands are not punctured.

As discussed above, the PRS PI may indicate that one or more TRPs have been preempted using the PRS-RNTI. The PRS-RNTI may identify a single TRP or may identify a number N of TRPs groups, each group including one or more TRPs. The UE may be configured, e.g., with LPP assistance data, with the PRS-RNTI for the one or more TRPs.

Figure 12:
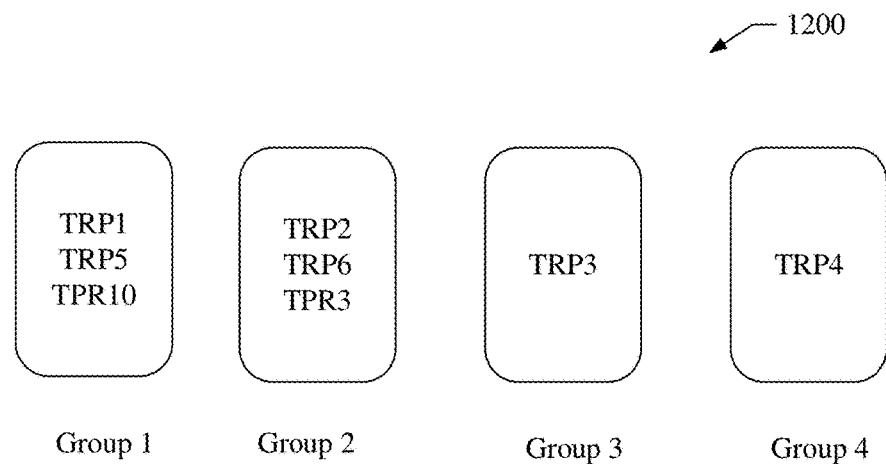
FIG. 12 illustrates groups of TRPs that may be configured in a UE.

FIG. 12, for example, illustrates four groups of TRPs 1200 that may be configured in a UE. As illustrated, Group 1 may include a number of TRPs, e.g., TRP1, TRP5, and TRP10, Group 2 may include, e.g., TRP 2, TRP6, and TRP3, and Group 3 and Group 4 may each include only a single TRP, e.g., TRP3 and TRP4, respectively. In one implementation, PRS-RNTI may identify a number N groups, each group associated with one TRP and including PRS resources or PRS resource sets for the TRP. Out of the K bits of the PRS PI indication, log 2(N) bits are used to signal which group of TRPs can be assumed do not transmit DL PRS during the configured signaled Time/Frequency resources, i.e., the DL PRS transmissions are preempted with a higher priority transmission.

Figure 13:
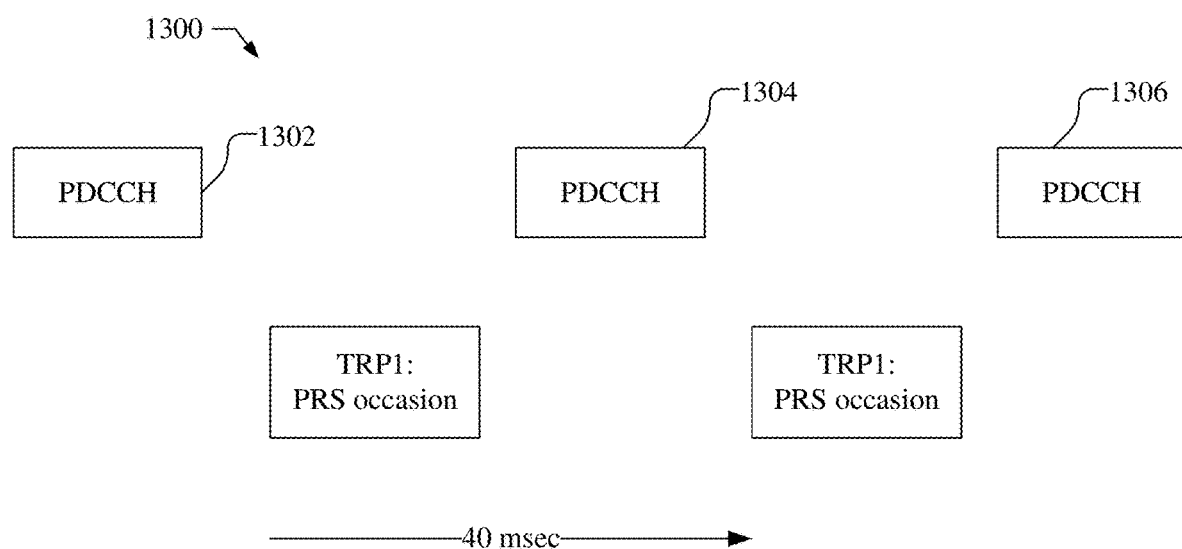
FIG. 13 illustrates a diagram showing a number of monitoring occasions with only a single PRS occasion for a TRP between each pair of monitoring occasions.

In one implementation, for each TRP, only one PRS occasion of the periodically transmitted PRS resources may be configured to be received by a UE between monitoring occasions. FIG. 13 illustrates a diagram 1300 showing a number of PDCCH monitoring occasions 1302, 1304, and 1306, and illustrates only a single PRS occasion for TRP1 between each pair of monitoring occasions 1302/1304 and 1304/1306.

Figure 14:
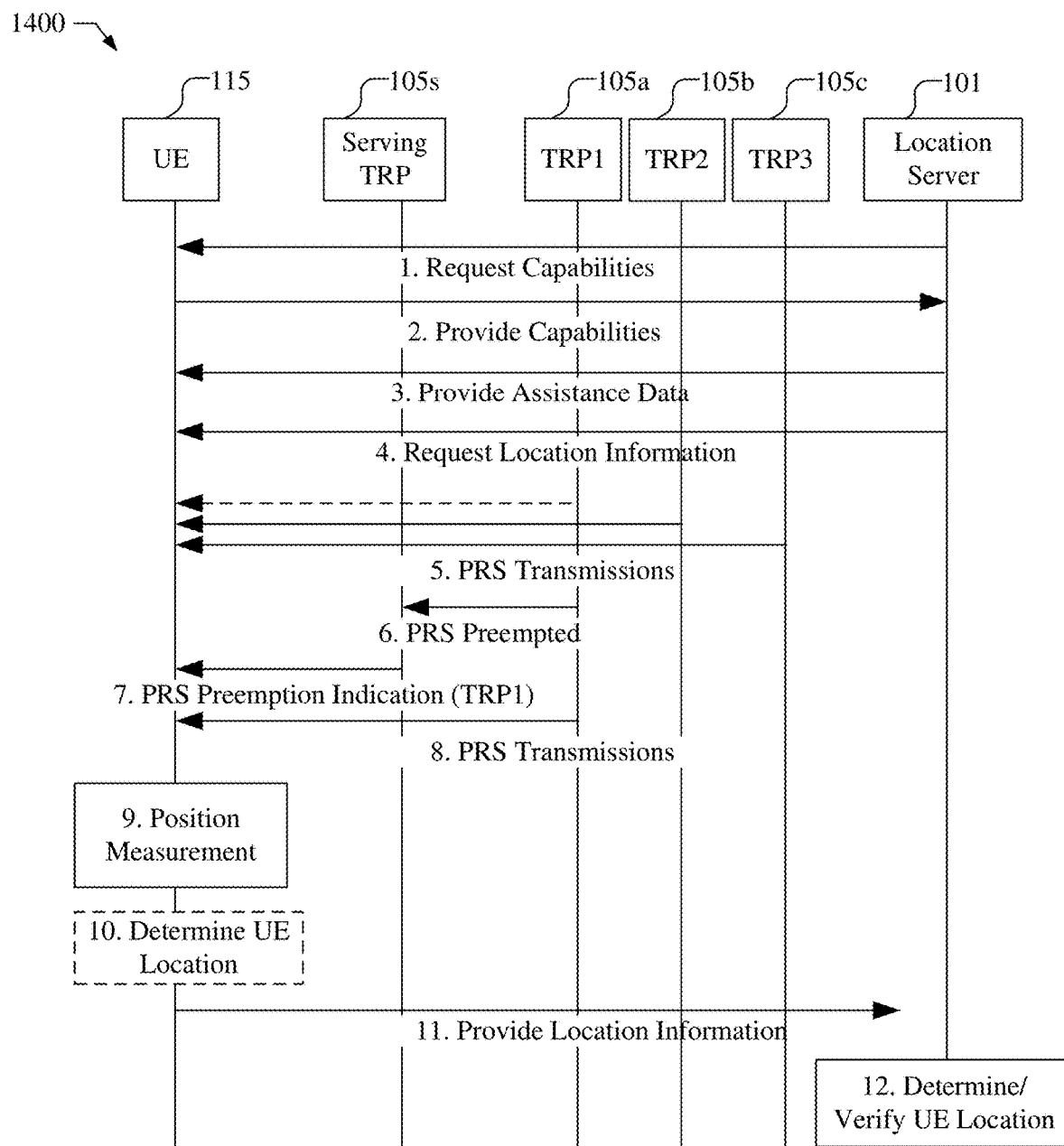
FIG. 14 is a message flow that illustrates various messages sent between components of the communication system during a location session for performing positioning measurements with PRS transmissions preempted with higher priority transmissions.

FIG. 14 is a message flow 1400 that illustrates various messages sent between components of the communication system 100 depicted in FIG. 1, during a location session for performing positioning measurements with PRS transmissions preempted with higher priority transmissions. In some implementations, the TRPs 1005s, 1005a, 1005b, 1005c (collectively referred to sometimes as TRPs 1005) may be base stations such as base stations 105 shown in FIG. 1 or sidelink UEs, such as UEs 115 shown in FIG. 1, or a combination thereof. Location server 164/196 may be, e.g., an LMF for a 5G NR network or E-SMLC in LTE. Location server 101 may be located remotely in the core network, e.g., core networks 160/190 shown in FIG. 1 or may be coincident with a base station or TRP, such as the serving TRP 1005s. The UE 115 may be configured to perform UE assisted positioning or UE based positioning, in which the UE itself determines its location using, for example, assistance data provided to it. In the signaling flow 1400, it is assumed that the UE 115 and location server 101 communicate using the LPP positioning protocol referred to earlier, although use of NPP or a combination of LPP and NPP or other future protocol, such as NRPPa, is also possible.

At stage 1, the location server 101 sends a Request Capabilities message to the UE 115, e.g., to request the capabilities from the UE 115.

At stage 2, the UE 115 returns a Provide Capabilities message to the location server 101, in which the UE 115 provides its capabilities to perform positioning.

At stage 3, the location server 101 may send an LPP Provide Assistance Data message to the UE 115 to provide positioning assistance data to configure the UE 115 to acquire and measure the DL PRS transmissions from TRP1 1005a, TRP2 1005b, and TRP3 1005c, e.g., the assistance data may include the DL PRS configurations for each of the TRPs. If the UE 115 is expected to perform the location calculation, e.g., in a UE based positioning procedure, the assistance data may include the physical locations of the TRPs. The assistance data message may additionally include configurations for identifiers of TRP or groups of TRPs.

At stage 4, the location server 101 sends an LPP Request Location Information message to the UE 115 to request the UE 115 to measure DL PRS transmission from the TRPs. For example, the location server 101 may request measurements of RSTD, if OTDOA is used, or other types of measurements. The location server 101 may also indicate whether UE based positioning is requested whereby the UE 115 determines its own location.

At stage 5, the UE acquires PRS transmissions from the TRPs 1005a, 1005b, and 1005c. In some implementations, e.g., where the TRPs 805 are base stations, the PRS may be DL PRS, and in some implementations, e.g., where the TRPs 805 are sidelink UEs, the PRS may be SL PRS, and in other implementations, the PRS may be a combination of DL PRS and SL PRS. The configured PRS transmission from TRP1 1005*a* is preempted by a higher priority transmissions, e.g., a URLLC, intended for another UE, as indicated by the broken arrow from TRP1 1005*a*.

At stage 6, the serving TRP 1005*s* receives an indication that the PRS from TRP1 1005*a* has been preempted. As illustrated in FIG. 14, the serving TRP 1005*s* may receive the indication directly, e.g., through a backhaul link with TRP1*a*, or may receive the indication indirectly through backhaul links from the TRP1 1005*a* to the location server 101 (or another core network entity), and from the location server 101 to the serving TRP 1005*s*.

At stage 7, the UE 115 receives a PRS PI, e.g., sent from the serving TRP 1005*s*, indicating that the PRS transmission from TRP1 1005*a* was preempted. As discussed above, the PRS PI may further indicate the preemption in the time domain and in the frequency domain, e.g., the symbols and the frequency sub-bands that are preempted.

At stage 8, the UE 115 may acquire a PRS transmission from the TRP1 1005*a*. It should be understood that the PRS transmission acquired by UE 115 in stage 8 may be close in time to the PRS transmissions of stage 5, e.g., may be within the same PRS resource or PRS resource set, or may be in a separate PRS occasion.

At stage 9, the UE 115 may perform the desired position measurements using the acquired PRS received from TRP2 1005*b* and TRP3 1005*c* at stage 5 and from TRP1 1005*c* at stage 8. The PRS from TRP1 1005*a* that UE 115 was configured to receive in stage 5 is not used in the position measurements due to the PRS PI received in stage 7 that indicated that the PRS was preempted. The UE 115, for example, may perform downlink based positioning measurements, such as TOA, RSTD, OTDOA, or AoD, etc., or downlink and uplink based positioning methods, e.g., RTT if uplink reference signals are used (not shown in FIG. 14).

At stage 10, the UE 115 may optionally determine the UE location, e.g., in a UE based positioning procedure, using the positioning measurements from stage 9 and known locations of the TRPs, e.g., acquired with the assistance data in stage 3.

At stage 11, the UE 115 send a Provide Location Information message to the location server 101 and includes the PRS based positioning measurements obtained at stage 9 and/or the UE location determined at optional stage 10.

At stage 12, the location server 101 determines the UE location based on any PRS based positioning measurements received at stage 11, or may verify the UE location received at stage 11.

Figure 15:
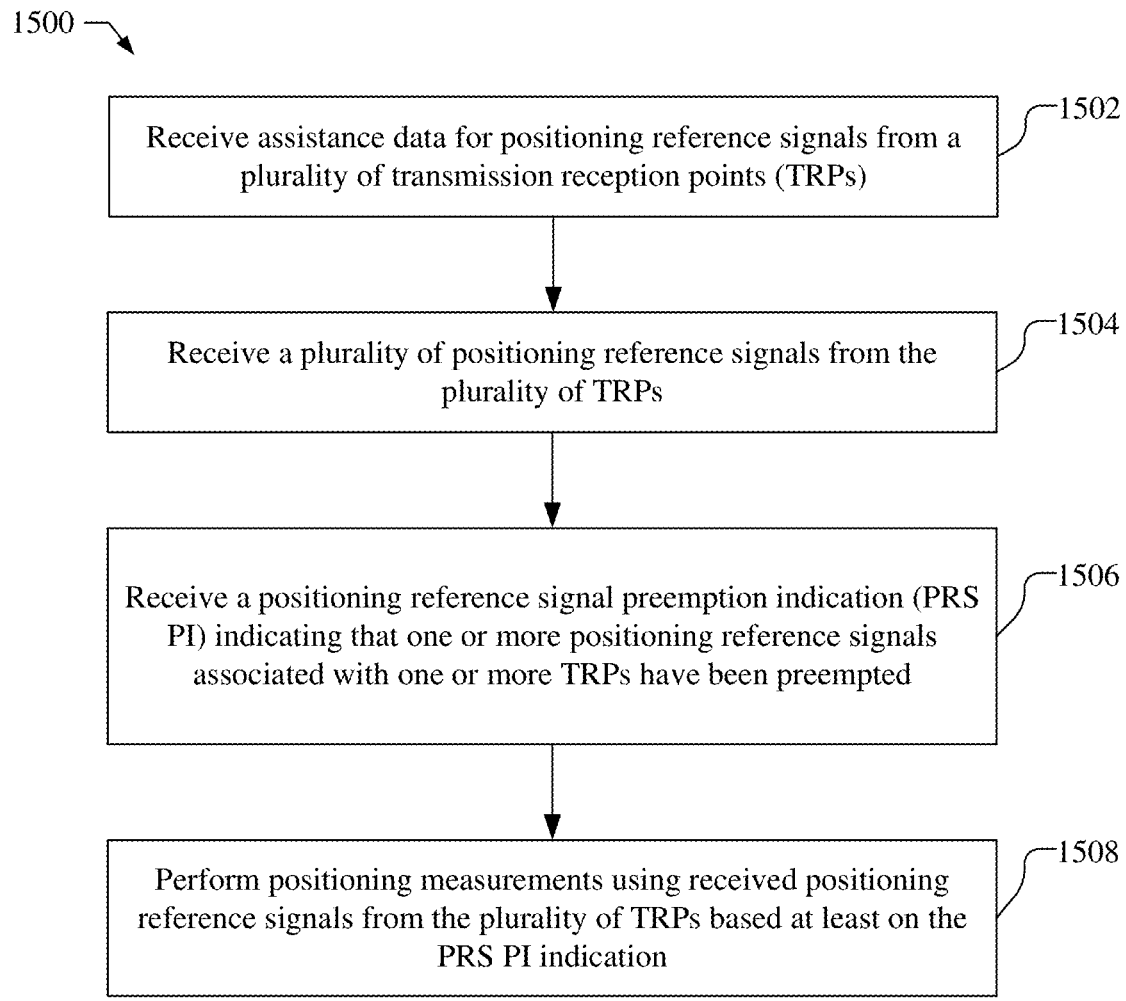
FIG. 15 shows a flowchart for an exemplary method for supporting positioning of a UE that is performed by the UE.

FIG. 15 shows a flowchart for an exemplary method 1500 for supporting positioning of a user equipment (UE) that is performed by the UE, such as UE 115, in a manner consistent with disclosed implementation.

At block 1502, the UE may receive assistance data for downlink positioning reference signals from a plurality of transmission reception points (TRPs), e.g., as discussed at stage 3 of FIG. 14. At block 1504, the UE may receive a plurality of positioning reference signals from the plurality of TRPs, e.g., as discussed at stage 5 of FIG. 14. At block 1506, the UE may receive a positioning reference signal preemption indication (PRS PI) indicating that one or more positioning reference signals associated with one or more TRPs have been preempted, e.g., as discussed at stage 7 of FIG. 14. The positioning reference signals may have been preempted by another transmission that has higher priority than preempted positioning reference signals. For example, the one or more TRPs may include or may not include the serving TRP. Further, the one or more TRPs may be a single TRP or may be a plurality of TRPs. At block 1508, the UE may perform positioning measurements using received positioning reference signals from the plurality of TRPs based at least on the PRS PI indication, e.g., as discussed at stage 9 of FIG. 14. For example, performing positioning measurements using received positioning reference signals from the plurality of TRPs based at least on the PRS PI indication may comprise excluding the preempted positioning reference signals from the positioning measurements, e.g., as discussed at stage 9 of FIG. 14.

In one implementation, the positioning reference signals may be downlink positioning reference signals and the PRS PI is received from a serving TRP, e.g., as discussed at stages 5, 7 and 8 of FIG. 14.

In one implementation, the positioning reference signals may be sidelink positioning reference signals and, the plurality of TRPs comprise sidelink UEs, e.g., as discussed at stages 5 and 8 of FIG. 14.

In one implementation, the method may further include the UE receiving replacement positioning reference signals from the one or more TRPs, wherein performing positioning measurements uses the received positioning reference signals from the plurality of TRPs and the replacement positioning reference signals from the one or more TRPs, e.g., as discussed at stages 8 and 9 of FIG. 14.

In one implementation, the PRS PI may contain a set of bits associated with an identifier for the one or more TRPs.

In one implementation, the PRS PI may contain a set of bits associated with time domain and frequency domain for the preempted positioning reference signals. The set of bits associated with the time domain and the frequency domain for the preempted positioning reference signals, for example, may identify a time of the preempted positioning reference signals based on a number of PRS symbols between two monitoring occasions, wherein only PRS symbols that contain positioning reference signals associated with the one or more TRPs are counted. The monitoring occasions may comprise physical downlink control channel (PDCCH) or medium access control control element (MAC CE). In one implementation, for each TRP, the UE is configured to receive only one positioning reference signal occasion between the monitoring occasions.

In another implementation, the set of bits associated with the time domain and the frequency domain for the preempted positioning reference signals may identify at least one frequency sub-band of the preempted positioning reference signals, wherein the preempted positioning reference signals are divided into four or more frequency sub-bands. In one implementation, the set of bits may identify only one frequency sub-band of the preempted positioning reference signals. For example, the set of bits may contain K bits and the preempted positioning reference signals may be divided into $2^{K-1}$ frequency sub-bands. In another implementation, the set of bits may identify one or more frequency bandwidths of the preempted positioning reference signals. For example, the set of bits may contain K bits and the positioning reference signals may be divided into $K-_1$ frequency sub-bands.

In one implementation, the UE may be configured with a plurality of groups of TRPs, each group of TRPs comprising one or more TRPs, wherein the PRS PI identifies one of the plurality of groups of TRPs.

Figure 16:
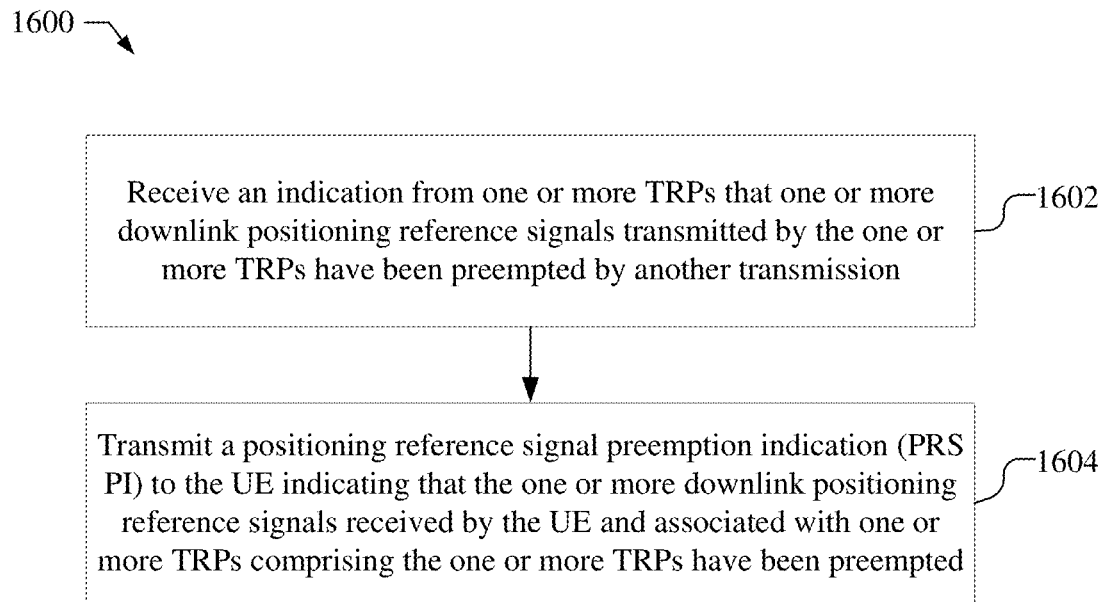
FIG. 16 shows a flowchart for an exemplary method for supporting positioning of a UE that is performed by a serving TRP.

FIG. 16 shows a flowchart for an exemplary method 1600 for supporting positioning of a user equipment (UE) that is performed by a serving transmission reception point (TRP), such as serving TRP 105*s*, in a manner consistent with disclosed implementation.

At block 1602, the serving TRP may receive an indication from one or more TRPs that one or more positioning reference signals transmitted by the one or more TRPs have been preempted by another transmission, e.g., as discussed at stage 6 of FIG. 14. For example, the positioning reference signals associated with the one or more TRPs may have been preempted by another transmission that has higher priority than preempted positioning reference signals. At block 1604, the serving TRP may transmit a positioning reference signal preemption indication (PRS PI) to the UE indicating that the one or more positioning reference signals received by the UE and associated with one or more TRPs comprising the one or more TRPs have been preempted, e.g., as discussed at stage 7 of FIG. 14. For example, the one or more TRPs may include or may not include the serving TRP. Further, the one or more TRPs may be a single TRP or may be a plurality of TRPs.

In one implementation, the PRS PI contains a set of bits associated with an identifier for the one or more TRPs.

In one implementation, the PRS PI may contain a set of bits associated with time domain and frequency domain for the preempted positioning reference signals. The set of bits associated with the time domain and the frequency domain for the preempted positioning reference signals, for example, may identify a time of the preempted positioning reference signals based on a number of PRS symbols between two monitoring occasions, wherein only PRS symbols that contain positioning reference signals associated with the one or more TRPs are counted. The monitoring occasions may comprise physical control channel (PDCCH) or medium access control control element (MAC CE). In one implementation, for each TRP, the UE is configured to receive only one positioning reference signal occasion between the monitoring occasions.

In another implementation, the set of bits associated with the time domain and the frequency domain for the preempted positioning reference signals may identify at least one frequency sub-band of the preempted positioning reference signals, wherein the preempted positioning reference signals are divided into four or more frequency sub-bands. In one implementation, the set of bits may identify only one frequency sub-band of the preempted positioning reference signals. For example, the set of bits may contain K bits and the preempted positioning reference signals may be divided into $2^{K-1}$ frequency sub-bands. In another implementation, the set of bits may identify one or more frequency bandwidths of the preempted positioning reference signals. For example, the set of bits may contain K bits and the positioning reference signals may be divided into K−1 frequency sub-bands.

In one implementation, the UE may be configured with a plurality of groups of TRPs, each group of TRPs comprising one or more TRPs, wherein the PRS PI identifies one of the plurality of groups of TRPs.

Figure 17:
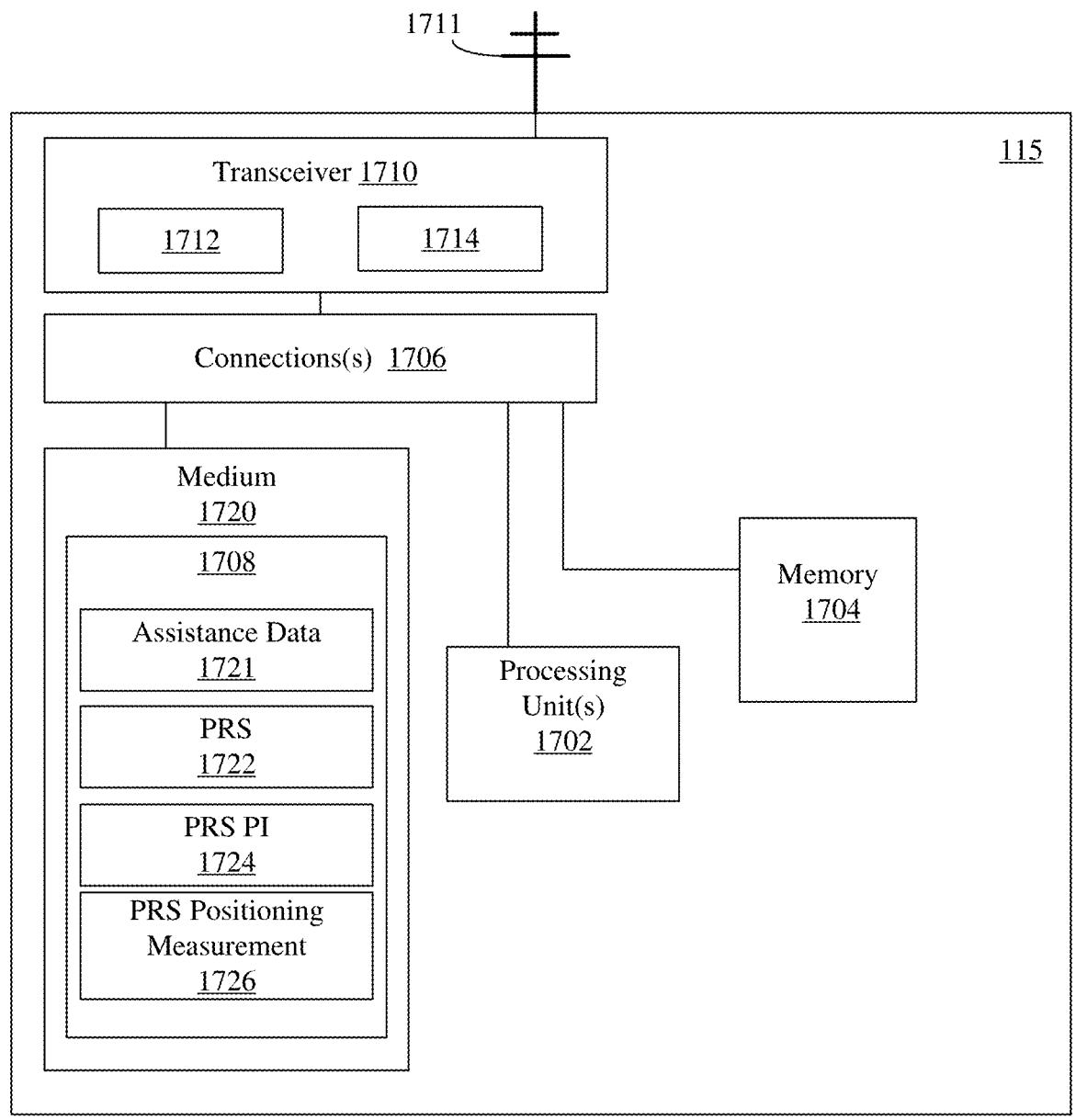
FIG. 17 illustrates a schematic block diagram showing certain exemplary features of a UE enabled to support positioning of the UE, where DL PRS transmissions from one or more TRPs are preempted by higher priority transmissions.

FIG. 17 shows a schematic block diagram illustrating certain exemplary features of a UE, e.g., UE 115, enabled to support positioning of the UE, where PRS transmissions from one or more TRPs are preempted by higher priority transmissions. UE 115 may, for example, include one or more processors 1702, memory 1704, and a transceiver 1710 (e.g., wireless network interface), which may be operatively coupled with one or more connections 1706 (e.g., buses, lines, fibers, links, etc.) to non-transitory computer readable medium 1720 and memory 1704. The UE 115 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 115 may take the form of a chipset, and/or the like. Transceiver 1710 may, for example, include a transmitter 1712 enabled to transmit one or more signals over one or more types of wireless communication networks and a receiver 1714 to receive one or more signals transmitted over the one or more types of wireless communication networks.

In some embodiments, UE 115 may include antenna 1711, which may be internal or external. UE antenna 1711 may be used to transmit and/or receive signals processed by transceiver 1710. In some embodiments, UE antenna 1711 may be coupled to transceiver 1710. In some embodiments, measurements of signals received (transmitted) by UE 115 may be performed at the point of connection of the UE antenna 1711 and transceiver 1710. For example, the measurement point of reference for received (transmitted) RF signal measurements may be an input (output) terminal of the receiver 1714 (transmitter 1712) and an output (input) terminal of the UE antenna 1711. In a UE 115 with multiple UE antennas 1711 or antenna arrays, the antenna connector may be viewed as a virtual point representing the aggregate output (input) of multiple UE antennas. In some embodiments, UE 115 may measure received signals including signal strength and TOA measurements and the raw measurements may be processed by the one or more processors 1702.

The one or more processors 1702 may be implemented using a combination of hardware, firmware, and software. For example, the one or more processors 1702 may be configured to perform the functions discussed herein by implementing one or more instructions or program code 1708 on a non-transitory computer readable medium, such as medium 1720 and/or memory 1704. In some embodiments, the one or more processors 1702 may represent one or more circuits configurable to perform at least a portion of a data signal computing procedure or process related to the operation of UE 115.

The medium 1720 and/or memory 1704 may store instructions or program code 1708 that contain executable code or software instructions that when executed by the one or more processors 1702 cause the one or more processors 1702 to operate as a special purpose computer programmed to perform the techniques disclosed herein. As illustrated in UE 115, the medium 1720 and/or memory 1704 may include one or more components or modules that may be implemented by the one or more processors 1702 to perform the methodologies described herein. While the components or modules are illustrated as software in medium 1720 that is executable by the one or more processors 1702, it should be understood that the components or modules may be stored in memory 1704 or may be dedicated hardware either in the one or more processors 1702 or off the processors.

A number of software modules and data tables may reside in the medium 1720 and/or memory 1704 and be utilized by the one or more processors 1702 in order to manage both communications and the functionality described herein. It should be appreciated that the organization of the contents of the medium 1720 and/or memory 1704 as shown in UE 115 is merely exemplary, and as such the functionality of the modules and/or data structures may be combined, separated, and/or be structured in different ways depending upon the implementation of the UE 115.

The medium 1720 and/or memory 1704 may include an assistance data unit 1721 that that when implemented by the one or more processors 1702 configures the one or more processors 1702 to receive assistance data, e.g., for PRS transmissions from one or more TRPs, e.g., via transceiver 1710.

The medium 1720 and/or memory 1704 may include a PRS unit 1722 that that when implemented by the one or more processors 1702 configures the one or more processors 1702 to receive PRS transmissions from one or more TRPs, e.g., via transceiver 1710. The TRPs may be base stations and/or SL UEs, and the PRS may be DL PRS, SL PRS, or a combination thereof.

The medium 1720 and/or memory 1704 may include a PRS PI unit 1724 that that when implemented by the one or more processors 1702 configures the one or more processors 1702 to receive a PRS PI from a serving TRP, e.g., via transceiver 1710, where the PRS PI may indicate that one or more PRS transmissions associated with a group of TRPs have been preempted by another transmission that has higher priority, and to determine the TRP, the time domain and frequency domain of the PRS transmissions that were preempted.

The medium 1720 and/or memory 1704 may include a PRS positioning measurement unit 1726 that that when implemented by the one or more processors 1702 configures the one or more processors 1702 to perform positioning measurements from received PRS transmissions received from one or more TRPs, e.g., via transceiver 1710, while excluding the preempted PRS from the positioning measurements.

The methodologies described herein may be implemented by various means depending upon the application. For example, these methodologies may be implemented in hardware, firmware, software, or any combination thereof. For a hardware implementation, the one or more processors 1702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1720 or memory 1704 that is connected to and executed by the one or more processors 1702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1708 on a non-transitory computer readable medium, such as medium 1720 and/or memory 1704. Examples include computer readable media encoded with a data structure and computer readable media encoded with a computer program 1708. For example, the non-transitory computer readable medium including program code 1708 stored thereon may include program code 1708 to support OTDOA measurements in a manner consistent with disclosed embodiments. Non-transitory computer readable medium 1720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1720, instructions and/or data may be provided as signals on transmission media included in a communication apparatus. For example, a communication apparatus may include a transceiver 1710 having signals indicative of instructions and data. The instructions and data are configured to cause one or more processors to implement the functions outlined in the claims. That is, the communication apparatus includes transmission media with signals indicative of information to perform disclosed functions.

Memory 1704 may represent any data storage mechanism. Memory 1704 may include, for example, a primary memory and/or a secondary memory. Primary memory may include, for example, a random access memory, read only memory, etc. While illustrated in this example as being separate from one or more processors 1702, it should be understood that all or part of a primary memory may be provided within or otherwise co-located/coupled with the one or more processors 1702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1720. As such, in certain example implementations, the methods and/or apparatuses presented herein may take the form in whole or part of a computer readable medium 1720 that may include computer implementable code 1708 stored thereon, which if executed by at least one processors 1702 may be operatively enabled to perform all or portions of the example operations as described herein. Computer readable medium 1720 may be a part of memory 1704.

Thus, a UE, such as UE 115, may include a means for receiving assistance data for positioning reference signals from a plurality of transmission reception points (TRPs), which may be, e.g., the wireless transceiver 1710 and one or more processing units 1702 with dedicated hardware or implementing executable code or software instructions in memory 1720 such as the assistance data unit 1721. A means for receiving a plurality of positioning reference signals from the plurality of TRPs may be, e.g., the wireless transceiver 1710 and one or more processing units 1702 with dedicated hardware or implementing executable code or software instructions in memory 1720 such as the PRS unit 1722. A means for receiving a positioning reference signal preemption indication (PRS PI) indicating that one or more positioning reference signals associated with one or more TRPs have been preempted may be, e.g., the wireless transceiver 1710 and one or more processing units 1702 with dedicated hardware or implementing executable code or software instructions in memory 1720 such as the PRS PI unit 1724. A means for performing positioning measurements using received positioning reference signals from the plurality of TRPs based at least on the PRS PI indication may be, e.g., the one or more processing units 1702 with dedicated hardware or implementing executable code or software instructions in memory 1720 such as the PRS positioning measurement unit 1726.

In one implementation, the means for performing positioning measurements using received positioning reference signals from the plurality of TRPs based at least on the PRS PI indication may exclude the preempted positioning reference signals from the positioning measurements.

In one implementation, the UE may further include a means for receiving replacement positioning reference signals from the one or more TRPs, wherein performing positioning measurements uses the received positioning reference signals from the plurality of TRPs and the replacement positioning reference signals from the one or more TRPs may be, e.g., the wireless transceiver 1710 and one or more processing units 1702 with dedicated hardware or implementing executable code or software instructions in memory 1720 such as the PRS unit 1722 and the PRS positioning measurement unit 1726.

Figure 18:
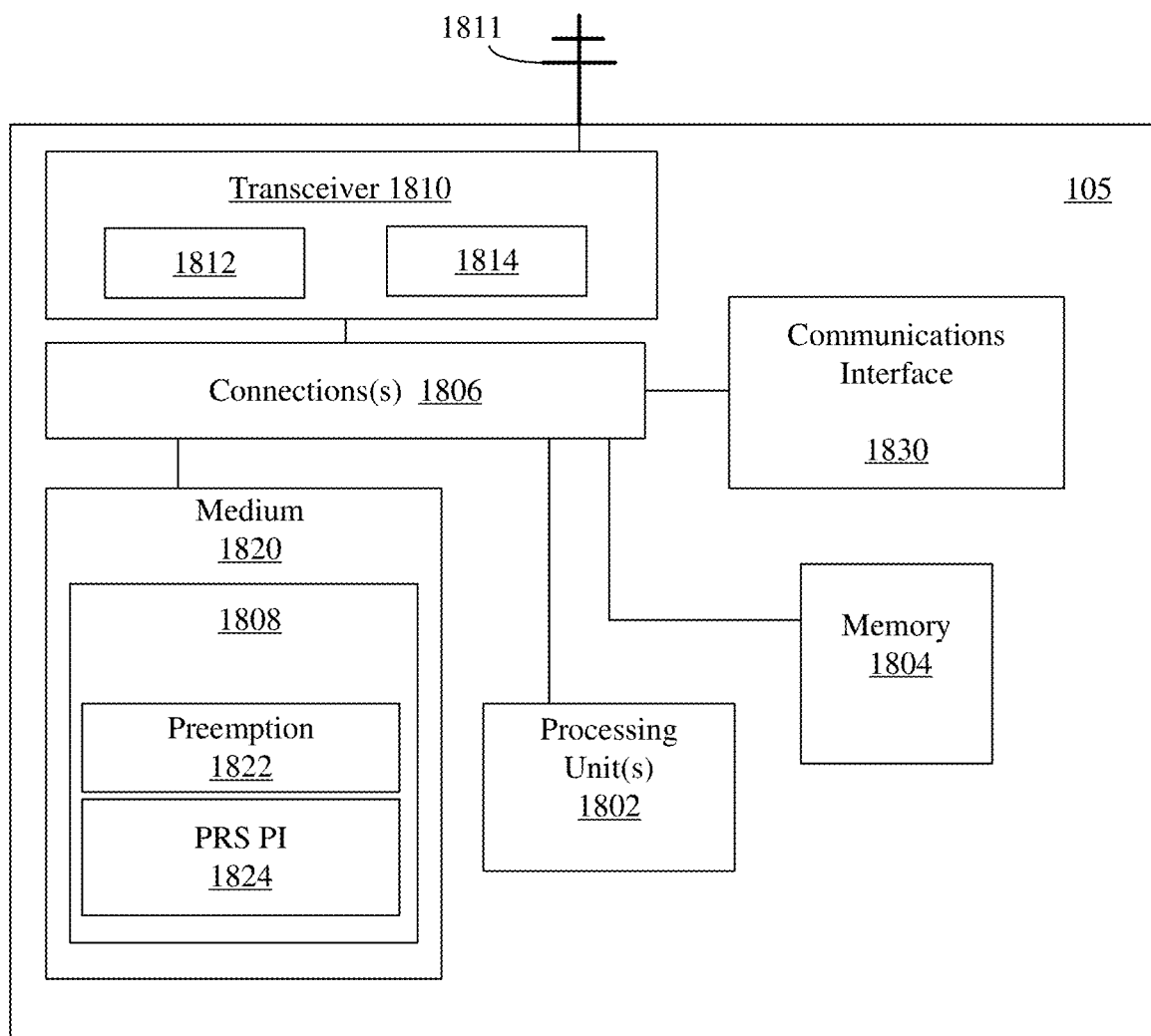
FIG. 18 illustrates a schematic block diagram showing certain exemplary features of a TRP enabled to support positioning of the UE, where DL PRS transmissions from one or more TRPs are preempted by higher priority transmissions.

FIG. 18 shows a schematic block diagram illustrating certain exemplary features of a TRP, e.g., TRP 105, enabled to support positioning of the UE, where PRS transmissions from one or more TRPs are preempted by higher priority transmissions. In some embodiments, TRP 105 may include, for example, one or more processors 1802, memory 1804, a transceiver 1810 (e.g., wireless network interface), and (as applicable) communications interface 1830 (e.g., wireline or wireless network interface to other TRPs and/or the core network), which may be operatively coupled with one or more connections 1806 (e.g., buses, lines, fibers, links, etc.) to non-transitory computer readable medium 1820 and memory 1804. In certain example implementations, some portion of TRP 105 may take the form of a chipset, and/or the like.

Transceiver 1810 may, for example, include a transmitter 1812 enabled to transmit one or more signals over one or more types of wireless communication networks and a receiver 1814 to receive one or more signals transmitted over the one or more types of wireless communication networks. TRP 105 may include antenna 1811 to transmit and/or receive signals processed by transceiver 1810.

Communications interface 1830 may include a variety of wired and wireless connections that support wired transmission and/or reception and, if desired, may additionally or alternatively support transmission and reception of one or more signals over one or more types of wireless communication networks. Communications interface 1806 may also include interfaces for communication with various other computers and peripherals. For example, in one embodiment, communications interface 1806 may comprise network interface cards, input-output cards, chips and/or ASICs that implement one or more of the communication functions performed by TRP 105. In some embodiments, communications interface 1806 may also interface with network 100 to obtain a variety of network configuration related information, such as PCIs, configured PRS information, and/or timing information used by the TRPs in the network.

The one or more processors 1802 may be implemented using a combination of hardware, firmware, and software. For example, one or more processors 1802 may be configured to perform the functions discussed herein by implementing one or more instructions or program code 1808 on a non-transitory computer readable medium, such as medium 1820 and/or memory 1804. In some embodiments, the one or more processors 1802 may represent one or more circuits configurable to perform at least a portion of a data signal computing procedure or process related to the operation of TRP 105.

The medium 1820 and/or memory 1804 may store instructions or program code 1808 that contain executable code or software instructions that when executed by the one or more processors 1802 cause the one or more processors 1802 to operate as a special purpose computer programmed to perform the techniques disclosed herein. As illustrated in TRP 105, the medium 1820 and/or memory 1804 may include one or more components or modules that may be implemented by the one or more processors 1802 to perform the methodologies described herein. While the components or modules are illustrated as software in medium 1820 that is executable by the one or more processors 1802, it should be understood that the components or modules may be stored in memory 1804 or may be dedicated hardware either in the one or more processors 1802 or off the processors.

A number of software modules and data tables may reside in the medium 1820 and/or memory 1804 and be utilized by the one or more processors 1802 in order to manage both communications and the functionality described herein. It should be appreciated that the organization of the contents of the medium 1820 and/or memory 1804 as shown in TRP 105 is merely exemplary, and as such the functionality of the modules and/or data structures may be combined, separated, and/or be structured in different ways depending upon the implementation of the TRP 105.

The medium 1820 and/or memory 1804 may include a preemption unit 1822 that that when implemented by the one or more processors 1802 configures the one or more processors 1802 to receive an indication from one or more TRPs, e.g., via communications interface 1830, that positioning reference signals transmitted by the one or more TRPs have been preempted by another transmission that has higher priority.

The medium 1820 and/or memory 1804 may include a PRS PI unit 1824 that that when implemented by the one or more processors 1802 configures the one or more processors 1802 to generate and transmit, e.g., via transceiver 1810, a positioning reference signal preemption indication (PRS PI) to an UE indicating that the positioning reference signals received by the UE and associated with a group of TRPs comprising the one or more TRPs have been preempted.

The methodologies described herein may be implemented by various means depending upon the application. For example, these methodologies may be implemented in hardware, firmware, software, or any combination thereof. For a hardware implementation, the one or more processors 1802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1820 or memory 1804 that is connected to and executed by the one or more processors 1802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1808 on a non-transitory computer readable medium, such as medium 1820 and/or memory 1804. Examples include computer readable media encoded with a data structure and computer readable media encoded with a computer program 1808. For example, the non-transitory computer readable medium including program code 1808 stored thereon may include program code 1808 to support OTDOA measurements in a manner consistent with disclosed embodiments. Non-transitory computer readable medium 1820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1820, instructions and/or data may be provided as signals on transmission media included in a communication apparatus. For example, a communication apparatus may include a transceiver 1810 having signals indicative of instructions and data. The instructions and data are configured to cause one or more processors to implement the functions outlined in the claims. That is, the communication apparatus includes transmission media with signals indicative of information to perform disclosed functions.

Memory 1804 may represent any data storage mechanism. Memory 1804 may include, for example, a primary memory and/or a secondary memory. Primary memory may include, for example, a random access memory, read only memory, etc. While illustrated in this example as being separate from one or more processors 1802, it should be understood that all or part of a primary memory may be provided within or otherwise co-located/coupled with the one or more processors 1802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1820. As such, in certain example implementations, the methods and/or apparatuses presented herein may take the form in whole or part of a computer readable medium 1820 that may include computer implementable code 1808 stored thereon, which if executed by at least one processors 1802 may be operatively enabled to perform all or portions of the example operations as described herein. Computer readable medium 1820 may be a part of memory 1804.

Thus, a serving TRP, e.g., TRP105, may include a means for receiving an indication from one or more TRPs that one or more positioning reference signals transmitted by the one or more TRPs have been preempted by another transmission, which may be, e.g., the communications interface 1830 and one or more processing units 1802 with dedicated hardware or implementing executable code or software instructions in memory 1820 such as the preemption unit 1822. A means for transmitting a positioning reference signal preemption indication (PRS PI) to the UE indicating that the one or more positioning reference signals received by the UE and associated with one or more TRPs comprising the one or more TRPs have been preempted may be, e.g., the wireless transceiver 1810 and one or more processing units 1802 with dedicated hardware or implementing executable code or software instructions in memory 1820 such as the PRS PI unit 1824.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method for supporting positioning of a user equipment (UE) performed by the UE, comprising: receiving assistance data for positioning reference signals from a plurality of transmission reception points (TRPs); receiving a plurality of positioning reference signals from the plurality of TRPs; receiving a positioning reference signal preemption indication (PRS PI) indicating that one or more positioning reference signals associated with one or more TRPs have been preempted; and performing positioning measurements using received positioning reference signals from the plurality of TRPs based at least on the PRS PI indication.

2. The method of clause 1, wherein the positioning reference signals are downlink positioning reference signals and the PRS PI is received from a serving TRP.

3. The method of clause 1, wherein the positioning reference signals are sidelink positioning reference signals and the plurality of TRPs comprise sidelink UEs.

4. The method of clause 1, wherein performing positioning measurements using received positioning reference signals from the plurality of TRPs based at least on the PRS PI indication comprises excluding the preempted positioning reference signals from the positioning measurements.

5. The method of clause 1, wherein the positioning reference signals associated with the one or more TRPs have been preempted by another transmission that has higher priority than preempted positioning reference signals.

6. The method of any of clauses 1-5, further comprising receiving replacement positioning reference signals from the one or more TRPs, wherein performing positioning measurements uses the received positioning reference signals from the plurality of TRPs and the replacement positioning reference signals from the one or more TRPs.

7. The method of any of clauses 1-6, wherein the one or more TRPs does not include the serving TRP.

8. The method of any of clauses 1-6, wherein the one or more TRPs includes the serving TRP.

9. The method of any of clauses 1-8, wherein the one or more TRPs is a single TRP.

10. The method of any of clauses 1-8, wherein the one or more TRPs comprises a plurality of TRPs.

11. The method of any of clauses 1-10, wherein the PRS PI contains a set of bits associated with an identifier for the one or more TRPs.

12. The method of any of clauses 1-10, wherein the PRS PI contains a set of bits associated with time domain and frequency domain for the preempted positioning reference signals.

13. The method of clause 12, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

14. The method of clause 13, wherein the monitoring occasions comprise physical downlink control channel (PDCCH) or medium access control control element (MAC CE).

15. The method of clause 13, wherein for each TRP, the UE is configured to receive only one positioning reference signal occasion between the monitoring occasions.

16. The method of clause 12, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

17. The method of clause 16, wherein the set of bits identifies only one frequency sub-band of the preempted positioning reference signals.

18. The method of clause 17, wherein the set of bits contains K bits and the preempted positioning reference signals are divided into 2K frequency sub-bands.

19. The method of clause 16, wherein the set of bits identifies one or more frequency bandwidths of the preempted positioning reference signals.

20. The method of clause 19, wherein the set of bits contains K bits and the positioning reference signals are divided into K frequency sub-bands.

21. The method of any of clauses 1-10 wherein the UE is configured with a plurality of groups of TRPs, each group of TRPs comprising one or more TRPs, wherein the PRS PI identifies one of the plurality of groups of TRPs.

22. A user equipment (UE) capable of supporting positioning for the UE, the UE comprising: at least one wireless transceiver configured to wirelessly communicate with a plurality of transmission reception points (TRPs); at least one memory; and at least one processor coupled to the at least one wireless transceiver and the at least one memory and configured to: receive assistance data for positioning reference signals from the plurality of TRPs; receive a plurality of positioning reference signals from the plurality of TRPs; receive a positioning reference signal preemption indication (PRS PI) indicating that one or more positioning reference signals associated with one or more TRPs have been preempted; and perform positioning measurements using received positioning reference signals from the plurality of TRPs based at least on the PRS PI indication.

23. The UE of clause 22, wherein the positioning reference signals are downlink positioning reference signals and the PRS PI is received from a serving TRP.

24. The UE of clause 22, wherein the positioning reference signals are sidelink positioning reference signals and the plurality of TRPs comprise sidelink UEs.

25. The UE of clause 22, wherein the at least one processor is configured to perform positioning measurements using received positioning reference signals from the plurality of TRPs based at least on the PRS PI indication by being configured to exclude the preempted positioning reference signals from the positioning measurements.

26. The UE of clause 22, wherein the positioning reference signals associated with the one or more TRPs have been preempted by another transmission that has higher priority than preempted positioning reference signals.

27. The UE of any of clauses 22-26, wherein the at least one processor is further configured to receive replacement positioning reference signals from the one or more TRPs, wherein the at least one processor is configured to perform positioning measurements using the received positioning reference signals from the plurality of TRPs and the replacement positioning reference signals from the one or more TRPs.

28. The UE of any of clauses 22-27, wherein the one or more TRPs does not include the serving TRP.

29. The UE of any of clauses 22-27, wherein the one or more TRPs includes the serving TRP.

30. The UE of any of clauses 22-29, wherein the one or more TRPs is a single TRP.

31. The UE of any of clauses 22-29, wherein the one or more TRPs comprises a plurality of TRPs.

32. The UE of any of clauses 22-31, wherein the PRS PI contains a set of bits associated with an identifier for the one or more TRPs.

33. The UE of any of clauses 22-31, wherein the PRS PI contains a set of bits associated with time domain and frequency domain for the preempted positioning reference signals.

34. The UE of clause 33, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

35. The UE of clause 34, wherein the monitoring occasions comprise physical downlink control channel (PDCCH) or medium access control control element (MAC CE).

36. The UE of clause 34, wherein for each TRP, the UE is configured to receive only one positioning reference signal occasion between the monitoring occasions.

37. The UE of clause 33, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

38. The UE of clause 37, wherein the set of bits identifies only one frequency sub-band of the preempted positioning reference signals.

39. The UE of clause 38, wherein the set of bits contains K bits and the preempted positioning reference signals are divided into 2K frequency sub-bands.

40. The UE of clause 37, wherein the set of bits identifies one or more frequency bandwidths of the preempted positioning reference signals.

41. The UE of clause 40, wherein the set of bits contains K bits and the positioning reference signals are divided into K frequency sub-bands.

42. The UE of any of clauses 22-31, wherein the UE is configured with a plurality of groups of TRPs, each group of TRPs comprising one or more TRPs, wherein the PRS PI identifies one of the plurality of groups of TRPs.

43. A user equipment (UE) capable of supporting positioning for the UE, the UE comprising: means for receiving assistance data for positioning reference signals from a plurality of transmission reception points (TRPs); means for receiving a plurality of positioning reference signals from the plurality of TRPs; means for receiving a positioning reference signal preemption indication (PRS PI) indicating that one or more positioning reference signals associated with one or more TRPs have been preempted; and means for performing positioning measurements using received positioning reference signals from the plurality of TRPs based at least on the PRS PI indication.

44. A non-transitory storage medium including program code stored thereon, the program code is operable to configure at least one processor in a user equipment (UE) to support positioning for the UE, the non-transitory storage medium comprising: program code to receive assistance data for positioning reference signals from a plurality of transmission reception points (TRPs); program code to receive a plurality of positioning reference signals from the plurality of TRPs; program code to receive a positioning reference signal preemption indication (PRS PI) indicating that one or more positioning reference signals associated with one or more TRPs have been preempted; and program code to perform positioning measurements using received positioning reference signals from the plurality of TRPs based at least on the PRS PI indication.

45. A method for supporting positioning of a user equipment (UE) performed by a serving transmission reception point (TRP), comprising: receiving an indication from one or more TRPs that one or more positioning reference signals transmitted by the one or more TRPs have been preempted by another transmission; and transmitting a positioning reference signal preemption indication (PRS PI) to the UE indicating that the one or more positioning reference signals received by the UE and associated with one or more TRPs comprising the one or more TRPs have been preempted.

46. The method of clause 45, wherein the positioning reference signals associated with the one or more TRPs have been preempted by another transmission that has higher priority than preempted positioning reference signals.

47. The method of either clause 45 or 46, wherein the one or more TRPs does not include the serving TRP.

48. The method of either clause 45 or 46, wherein the one or more TRPs includes the serving TRP.

49. The method of either clause 45 or 46, wherein the one or more TRPs includes a single TRP.

50. The method of either clause 45 or 46, wherein the one or more TRPs comprises a plurality of TRPs.

51. The method of any of clauses 45-50, wherein the PRS PI contains a set of bits associated with an identifier for the one or more TRPs.

52. The method of any of clauses 45-50, wherein the PRS PI contains a set of bits associated with time domain and frequency domain for the preempted positioning reference signals.

53. The method of clause 52, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

54. The method of clause 53, wherein the monitoring occasions comprise physical downlink control channel (PDCCH) or medium access control—control element (MAC CE).

55. The method of clause 54, wherein for each TRP, the UE is configured to receive only one positioning reference signal occasion between the monitoring occasions.

56. The method of clause 52, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

57. The method of clause 56, wherein the set of bits identifies only one frequency sub-band of the preempted positioning reference signals.

58. The method of clause 57, wherein the set of bits contains K bits and the preempted positioning reference signals are divided into 2K frequency sub-bands.

59. The method of clause 56, wherein the set of bits identifies one or more frequency bandwidths of the preempted positioning reference signals.

60. The method of clause 59, wherein the set of bits contains K bits and the positioning reference signals are divided into K frequency sub-bands.

61. The method of any of clauses 45-50, wherein the UE is configured with a plurality of groups of TRPs, each group of TRPs comprising one or more TRPs, wherein the PRS PI identifies one of the plurality of groups of TRPs.

62. A serving transmission reception point (TRP) configured to support positioning of a user equipment (UE), the serving TRP comprising: at least one external interface configured to communicate with the UE and a wireless network; at least one memory; and at least one processor coupled to the at least one external interface and the at least one memory and configured to: receive an indication from one or more TRPs in the wireless network that one or more positioning reference signals transmitted by the one or more TRPs have been preempted by another transmission; and transmitting a positioning reference signal preemption indication (PRS PI) to the UE indicating that the positioning reference signals received by the UE and associated with one or more TRPs comprising the one or more TRPs have been preempted.

63. The serving TRP of clause 62, wherein the positioning reference signals associated with the one or more TRPs have been preempted by another transmission that has higher priority than preempted positioning reference signals.

64. The serving TRP of either clause 62 or 63, wherein the one or more TRPs does not include the serving TRP.

65. The serving TRP of either clause 62 or 63, wherein the one or more TRPs includes the serving TRP.

66. The serving TRP of either clause 62 or 63, wherein the one or more TRPs includes a single TRP.

67. The serving TRP of either clause 62 or 63, wherein the one or more TRPs comprises a plurality of TRPs.

68. The serving TRP of any of clauses 62-67, wherein the PRS PI contains a set of bits associated with an identifier for the one or more TRPs.

69. The serving TRP of any of clauses 62-67, wherein the PRS PI contains a set of bits associated with time domain and frequency domain for the preempted positioning reference signals.

70. The serving TRP of clause 69, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

71. The serving TRP of clause 70, wherein the monitoring occasions comprise physical downlink control channel (PDCCH) or medium access control control element (MAC CE).

72. The serving TRP of clause 71, wherein for each TRP, the UE is configured to receive only one positioning reference signal occasion between the monitoring occasions.

73. The serving TRP of clause 69, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

74. The serving TRP of clause 73, wherein the set of bits identifies only one frequency sub-band of the preempted positioning reference signals.

75. The serving TRP of clause 74, wherein the set of bits contains K bits and the preempted positioning reference signals are divided into 2K frequency sub-bands.

76. The serving TRP of clause 73, wherein the set of bits identifies one or more frequency bandwidths of the preempted positioning reference signals.

77. The serving TRP of clause 76, wherein the set of bits contains K bits and the positioning reference signals are divided into K frequency sub-bands.

78. The serving TRP of any of clauses 62-67, wherein the UE is configured with a plurality of groups of TRPs, each group of TRPs comprising one or more TRPs, wherein the PRS PI identifies one of the plurality of groups of TRPs.

79. A serving transmission reception point (TRP) configured to support positioning of a user equipment (UE), the serving TRP comprising: means for receiving an indication from one or more TRPs that one or more positioning reference signals transmitted by the one or more TRPs have been preempted by another transmission; and means for transmitting a positioning reference signal preemption indication (PRS PI) to the UE indicating that the one or more positioning reference signals received by the UE and associated with one or more TRPs comprising the one or more TRPs have been preempted.

80. A non-transitory storage medium including program code stored thereon, the program code is operable to configure at least one processor in a serving transmission reception point (TRP) to support positioning of a user equipment (UE), the non-transitory storage medium comprising: program code to receive an indication from one or more TRPs that one or more positioning reference signals transmitted by the one or more TRPs have been preempted by another transmission; and program code to transmit a positioning reference signal preemption indication (PRS PI) to the UE indicating that the one or more positioning reference signals received by the UE and associated with one or more TRPs comprising the one or more TRPs have been preempted.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting positioning of a user equipment (UE) performed by the UE, comprising:
   receiving assistance data for positioning reference signals from a plurality of transmission reception points (TRPs);
   receiving a plurality of positioning reference signals from the plurality of TRPs;
   receiving a positioning reference signal preemption indication (PRS PI) indicating that one or more positioning reference signals associated with one or more TRPs have been preempted; and
   performing positioning measurements using received positioning reference signals from the plurality of TRPs based at least on the PRS PI indication, wherein performing the positioning measurements comprises excluding the preempted positioning reference signals from the positioning measurements.

2. The method of claim 1, wherein the positioning reference signals are downlink positioning reference signals and the PRS PI is received from a serving TRP.

3. The method of claim 1, wherein the positioning reference signals are sidelink positioning reference signals and the plurality of TRPs comprise sidelink UEs.

4. The method of claim 1, wherein the positioning reference signals associated with the one or more TFPs have been preempted by another transmission that has higher priority than preempted positioning reference signals.

5. The method of claim 1, further comprising receiving replacement positioning reference signals from the one or more TRPs, wherein performing positioning measurements uses the received positioning reference signals from the plurality of TRPs and the replacement positioning reference signals from the one or more TRPs.

6. The method of claim 1, wherein the PRS PI contains a set of bits associated with an identifier for the one or more TRPs.

7. The method of claim 1, wherein the PRS PI contains a set of bits associated with time domain and frequency domain for the preempted positioning reference signals.

8. The method of claim 7, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

9. The method of claim 8, wherein the monitoring occasions comprise physical downlink control channel (PDCCH) or medium access control control element (MAC CE).

10. The method of claim 7, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

11. The method of claim 10, wherein the set of bits identifies only one frequency sub-band of the preempted positioning reference signals.

12. The method of claim 11, wherein the set of bits contains K bits and the preempted positioning reference signals are divided into 2K frequency sub-bands.

13. The method of claim 10, wherein the set of bits identifies one or more frequency bandwidths of the preempted positioning reference signals.

14. The method of claim 13, wherein the set of bits contains K bits and the positioning reference signals are divided into K frequency sub-bands.

15. The method of claim 1, wherein the UE is configured with a plurality of groups of TRPs, each group of TRPs comprising one or more TRPs, wherein the PRS PI identifies one of the plurality of groups of TRPs.

16. A user equipment (UE) capable of supporting positioning for the UE, the UE comprising:
   at least one wireless transceiver configured to wirelessly communicate with a plurality of transmission reception points (TRPs);
   at least one memory; and
   at least one processor coupled to the at least one wireless transceiver and the at least one memory and configured to:
      receive assistance data for positioning reference signals from the plurality of TRPs;
      receive a plurality of positioning reference signals from the plurality of TRPs;
      receive a positioning reference signal preemption indication (PRS PI) indicating that one or more positioning reference signals associated with one or more TRPs have been preempted; and
      perform positioning measurements using received positioning reference signals from the plurality of TRPs based at least on the PRS PI indication, wherein the at least one processor configured to perform the positioning measurements is configured to exclude the preempted positioning reference signals from the positioning measurements.

17. The UE of claim 16, wherein the positioning reference signals are downlink positioning reference signals and the PRS PI is received from a serving TRP.

18. The UE of claim 16, wherein the positioning reference signals are sidelink positioning reference signals and the plurality of TRPs comprise sidelink UEs.

19. The UE of claim 16, wherein the positioning reference signals associated with the one or more TRPs have been preempted by another transmission that has higher priority than preempted positioning reference signals.

20. The UE of claim 16, wherein the at least one processor is further configured to receive replacement positioning reference signals from the one or more TRPs, wherein the at least one processor is configured to perform positioning measurements using the received positioning reference signals from the plurality of TRPs and the replacement positioning reference signals from the one or more TRPs.

21. The UE of claim 16, wherein the PRS PI contains a set of bits associated with an identifier for the one or more TRPs.

22. The UE of claim 16, wherein the PRS PI contains a set of bits associated with time domain and frequency domain for the preempted positioning reference signals.

23. The UE of claim 22, wherein the set of bits associated with the time domain and the frequency domain for the preempted positioning reference signals identifies a time of the preempted positioning reference signals based on a number of PRS symbols between two monitoring occasions, wherein only PRS symbols that contain positioning reference signals associated with the one or more TRPs are counted.

24. The UE of claim 23, wherein the monitoring occasions comprise physical downlink control channel (PDCCH) or medium access control element (MAC CE).

25. The UE of claim 22, wherein the set of bits associated with the time domain and the frequency domain for the preempted positioning reference signals identifies at least one frequency sub-band of the preempted positioning reference signals, wherein the preempted positioning reference signals are divided into four or more frequency sub-bands.

26. The UE of claim 25, wherein the set of bits identifies only one frequency sub-band of the preempted positioning reference signals.

27. The UE of claim 26, wherein the set of bits contains K bits and the preempted positioning reference signals are divided into 2K frequency sub-bands.

28. The UE of claim 25, wherein the set of bits identifies one or more frequency bandwidths of the preempted positioning reference signals.

29. The UE of claim 28, wherein the set of bits contains K bits and the positioning reference signals are divided into K frequency sub-bands.

30. The UE of claim 16, wherein the UE is configured with a plurality of groups of TRPs, each group of TRPs comprising one or more TRPs, wherein the PRS PI identifies one of the plurality of groups of TRPs.

31. A user equipment (UE) capable of supporting positioning for the UE, the UE comprising:
 means for receiving assistance data for positioning reference signals from a plurality of transmission reception points (TRPs);
 means for receiving a plurality of positioning reference signals from the plurality of TRPs;
 means for receiving a positioning reference signal preemption indication (PRS PI) indicating that one or more positioning reference signals associated with one or more TRPs have been preempted; and
 means for performing positioning measurements using received positioning reference signals from the plurality of TRPs based at least on the PRS PI indication, wherein the means for performing the positioning measurements is configured to exclude the preempted positioning reference signals from the positioning measurements.

32. A non-transitory storage medium including program code stored thereon, the program code is operable to configure at least one processor in a user equipment (UE) to support positioning for the UE, the non-transitory storage medium comprising:
 program code to receive assistance data for positioning reference signals from a plurality of transmission reception points (TRPs);
 program code to receive a plurality of positioning reference signals from the plurality of TRPs;
 program code to receive a positioning reference signal preemption indication (PRS PI) indicating that one or more positioning reference signals associated with one or more TRPs have been preempted; and
 program code to perform positioning measurements using received positioning reference signals from the plurality of TRPs based at least on the PRS PI indication, wherein performing the positioning measurements comprises excluding the preempted positioning reference signals from the positioning measurements.

* * * * *